(12) United States Patent
Wang et al.

(10) Patent No.: US 9,171,250 B2
(45) Date of Patent: Oct. 27, 2015

(54) RESTORATION SWITCHING ANALYSIS WITH MODIFIED GENETIC ALGORITHM

(75) Inventors: Zhenyuan Wang, Cary, NC (US);
Vaibhav D. Donde, Cary, NC (US);
James Stoupis, Durham, NC (US);
Wenping Li, Fulshear, TX (US);
William Peterson, Fulshear, TX (US)

(73) Assignee: ABB Research Ltd., Zurich (CH)

( * ) Notice: Subject to any disclaimer, the term of this patent is extended or adjusted under 35 U.S.C. 154(b) by 664 days.

(21) Appl. No.: 13/512,475

(22) PCT Filed: Dec. 2, 2010

(86) PCT No.: PCT/US2010/058759
§ 371 (c)(1),
(2), (4) Date: May 29, 2012

(87) PCT Pub. No.: WO2011/068989
PCT Pub. Date: Jun. 9, 2011

(65) Prior Publication Data
US 2012/0232713 A1    Sep. 13, 2012

Related U.S. Application Data

(60) Provisional application No. 61/266,642, filed on Dec. 4, 2009.

(51) Int. Cl.
*G05D 11/00* (2006.01)
*G06F 15/18* (2006.01)
*G06N 3/12* (2006.01)

(52) U.S. Cl.
CPC ...................................... *G06N 3/126* (2013.01)

(58) Field of Classification Search
CPC ......... G06N 3/126; G06N 3/086; G06N 3/12; G06N 3/08; G06N 99/005; G06N 3/004; G06N 3/0436; G06N 3/082; G06N 5/025; G06N 5/04; G06N 7/00; G06F 19/18; G06F 19/24; G06F 19/22; G06F 17/50
USPC ............................................. 700/295; 706/13
See application file for complete search history.

(56) References Cited

U.S. PATENT DOCUMENTS 5,541,848 A * 7/1996 McCormack et al. ........ 700/213
7,979,222 B2   7/2011 Donde
(Continued)

FOREIGN PATENT DOCUMENTS

WO    2009076410    6/2009
WO    2011069061    6/2011

OTHER PUBLICATIONS

Sheng et al., "Random Adaptive Optimizer Restores Distribution Services", IEEE, 2000, 48-51.*

(Continued)

*Primary Examiner* — Robert Fennema
*Assistant Examiner* — Thomas Stevens
(74) *Attorney, Agent, or Firm* — Steven W. Hudnut; Michael C. Prewitt

(57) ABSTRACT

The method of determining back-feed paths is capable of efficiently solving multi-layer restoration problems by minimizing a fitness function using an iterative genetic algorithm. The method optimizes back-feeding of out-of-service areas by minimizing power loss, switching, unserved loads and voltage/current violations. The efficiency of the algorithm is further increased through the use of a reactive Tabu search to prevent duplicate candidate systems.

22 Claims, 20 Drawing Sheets

(56) References Cited

U.S. PATENT DOCUMENTS

| | | | |
|---|---|---|---|
| 8,666,558 B2 | 3/2014 | Wang | |
| 8,793,202 B2 | 7/2014 | Wang et al. | |
| 2002/0057018 A1* | 5/2002 | Branscomb et al. | 307/42 |
| 2002/0064010 A1* | 5/2002 | Nelson et al. | 361/64 |
| 2012/0239601 A1 | 9/2012 | Wang et al. | |

OTHER PUBLICATIONS

Ventresca et al., "A Genetic Algorithm for the Design of Minimum-Cost Two-Connected Networks with Bounded Rings", Imperial College Press, 2005, vol. 5, No. 2, pp. 267-281.*

F. Postiglione, Reply to Communication pursuant to Rules 161 (1) and 162 EPC in corresponding European Application No. 10799151.5 May 6, 2013, 12 pages.

The Patent Office of the People's Republic of China, First Office Action for corresponding Chinese patent application No. 201080054795.4, Apr. 11, 2014, 7 pages.

Steven Hudnut, Instructions and Claims for Response to First Office Action issued Apr. 11, 2014 for corresponding Chinese patent application No. 201080054795.4, Oct. 20, 2014, 5 pages.

European Patent Office, Communication Pursuant to Article 94(3) EPC for corresponding European Patent application No. EP 10799151.5, Jun. 16, 2014, 4 pages.

Henriette Huysing-Solles, International Searching Authority (EPO), International Search Report and Written Opinion of the International Searching Authority for corresponding International Application No. PCT/US2010/058759, European Patent Office, mailed Mar. 11, 2011, 4 pages.

Zhang Dong, Fu Zhengcai, Zhang Liuchun and Song Zhengqiang, "Network Reconfiguration in Distribution Systems Using a Modified TS Algorithm," Proceedings of the 7th WSEAS International Conference on Mathematical Methods and Computational Techniques in Electrical Engineering, pp. 310-314, Oct. 27, 2005.

Ning Xiong, Haozhong Cheng, Liangzhong Yao and Masoud Bazargan, "Switch Group Based Tabu Search Algorithm for Distribution Network Reconfiguration," Proceedings of the 3rd International Conference on Electric Utility Deregulation and Restructuring and Power Technologies, (DRPT '08), pp. 820-822, Apr. 6, 2008, Nanjing China.

Fred Glover and Manuel Laguna, "Tabu Search," Handbook of Combinatorial Optimization, vol. 3, pp. 621-757, Kluwer Academic Publishers, 1998.

Xiuxia Yang and Yi Zhang, "Intelligent Real-time Fault Restoration of the Large Shipboard Power System Based on Genetic Algorithm," International Journal of Information Technology, vol. 11, No. 12, pp. 129-135, 2005.

W. P. Luan, M. R. Irving and J. S. Daniel, "Genetic algorithm for supply restoration and optimal load shedding in power system distribution networks," IEE Proceedings: Generation, Transmission and Distribution, vol. 149, No. 2, pp. 145-151, Mar. 15, 2002.

Romeu M. V. Vitorino, Humberto M. M. Jorge and Luis M. P. Neves, "Network Reconfiguration Using a Genetic Approach for Loss and Reliability Optimization in Distribution Systems," Proceedings of the International Conference on Power Engineering, Energy and Electrical Drives, (POWERENG '09), pp. 84-89, Mar. 18, 2009.

James Stoupis, Zhenyuan Wang, Fang Yang, Vaibhav Donde, Fahrudin Mekic and William Peterson, "Restoring confidence," ABB Review: The Corporate Technical Journal of the ABB Group, vol. 3/2009, pp. 17-22, Sep. 10, 2009.

K. Aoki, K. Nara, M. Itoh, T. Satoh, H. Kuwabara, "A New Algorithm for Service Restoration in Distribution Systems," IEEE Transactions on Power Delivery, vol. 4, No. 3, pp. 1832-1839, Jul. 1989.

E.M. Carreno, N. Moreira, R. Romero, "Distribution network reconfiguration using an efficient evolutionary algorithm," Proceedings of the 2007 IEEE PES General Meeting, 6 pages.

Y. Fukuyama, H.D. Chiang, "A Parallel Genetic Algorithm for Service Restoration in Electric Power Distribution Systems," pp. 275-281, IEEE 1995.

Y.Y. Hsu, H.M. Huang, H.C. Kuo, S.K. Peng, C.W. Chang, K.J. Chang, H.S. Yu, C.E. Chow, R.T. Kuo, "Distribution System Service Restoration Using a Heuristic Search Approach," IEEE Transactions on Power Delivery, vol. 7, No. 2, pp. 734-740, Apr. 1992.

K.N. Miu, H.D. Chiang, R.J. McNulty, "Multi-Tier Service Restoration Through Network Reconfiguration and Capacitor Control for Large-Scale Radial Distribution Networks," pp. 153-159, IEEE 1999.

K.N. Miu, H.D. Chiang, B. Yuan, G. Darling, "Fast Service Restoration for Large-Scale Distribution Systems with Priority Customers and Constraints." IEEE Transactions on Power Systems, vol. 13, No. 3, pp. 789-795, Aug. 1998.

A.L. Morelato, A. Monticelli, "Heuristic Search Approach to Distribution System Restoration," IEEE Transactions on Power Delivery, vol. 4, No. 4, pp. 2235-2241, Oct. 1989.

Y.M. Park, K.H. Lee, "Application of Expert System to Power System Restoration in Sub-Control Center," IEEE Transactions on Power Systems, vol. 12, No. 2, pp. 629-635, May 1997.

G. Peponis, M. Papadopoulos, "Reconfiguration of radial distribution networks: application of heuristic methods on large-scale networks," IEE Proceedings on Generation, Transmission and Distribution, vol. 142, No. 6, pp. 631-638, Nov. 1995.

S. Toune, H. Fudo, T. Genji, Y. Fukuyama, Y. Nakanishi, "Comparative Study of Modern Heuristic Algorithms to Service Restoration in Distribution Systems," IEEE Transactions on Power Delivery, vol. 17, No. 1, pp. 173-181, Jan. 2002.

I. Watanabe, M. Nodu, "A Genetic Algorithm for Optimizing Switching Sequence of Service Restoration in Distribution Systems," pp. 1683-1689, IEEE 2004.

Ferruccio Postiglione, Response to EPO Communication Pursuant to Article 94(3) EPC in corresponding European Application No. 10799151.5, Mar. 10, 2015, 15 pages.

The State Intellectual Property Office of the People's Republic of China; Second Office Action for corresponding Chinese patent application No. 201080054795.4, Jan. 12, 2015, 10 pages.

C.C. Liu, S.J. Lee, S.S. Venkata, "An Expert System Operational Aid for Restoration and Loss Reduction of Distribution Systems," IEEE Transactions on Power Systems, vol. 3, No. 2, pp. 619-626, May 1988.

Ferruccio Postiglione, Response to EPO Communication Pursuant to Article 94(3) EPC in corresponding European Application No. 10799151.5, Mar. 10, 2015. 15 pages.

The State Intellectual Property Office of the People's Republic of China; Second Office Action for corresponding Chinese patent application No. 201080054795.4, Jan. 12, 2015. 10 pages.

Steven Hudnut, Instructions and Claims for Response to Second Office Action issued Jan. 12, 2015 for corresponding Chinese patent application No. 201080054795.4, May 21, 2015. 10 pages.

* cited by examiner

| INDEX: IDV | CHROMOSOME | NOTES | $W_{SW}$ | NO TIE SWITCHES BASE | $W_{WO}$ | NO CURRENT VIOLATIONS BASE | $W_{SHED}$ | LOAD BASE | NO SWITCH OPERATIONS (IDV) | NO CURRENT VIOLATIONS (IDV) | UNSERVED LOAD (IDV) | FITNESS FUNCTION F (IDV) |
|---|---|---|---|---|---|---|---|---|---|---|---|---|
| 0 | 000000000000 | BASE | 0.1 | 5 | 0.35 | 2 | 0.55 | 1700 | 2 | 2 | 0 | 0.39 |

FIG. 11

| INDEX: IDV | CHROMOSOME | SWAPPINGS | $W_{SW}$ | NO TIE SWITCHES BASE | $W_{MO}$ | NO CURRENT VIOLATIONS BASE | $W_{SHED}$ | LOAD BASE | NO SWITCH OPERATIONS (IDV) | NO CURRENT VIOLATIONS (IDV) | UNSERVED LOAD (IDV) | FITNESS FUNCTION F(IDV) |
|---|---|---|---|---|---|---|---|---|---|---|---|---|
| 1.B | [000000000000012] | 12-24 | 0.1 | 5 | 0.35 | 2 | 0.55 | 1700 | 4 | 1 | 0 | 0.255 |
| 1.G | [000170000000000] | 9-17 | 0.1 | 5 | 0.35 | 2 | 0.55 | 1700 | 4 | 1 | 0 | 0.255 |
| 1.E | [000002001200000] | 11-12, 16-20 | 0.1 | 5 | 0.35 | 2 | 0.55 | 1700 | 6 | 0 | 500 | 0.281764706 |
| 1.H | [003000000000000] | 5-3 | 0.1 | 5 | 0.35 | 2 | 0.55 | 1700 | 4 | 2 | 0 | 0.43 |
| 1.F | [000170001200000] | 9-17, 11-12 | 0.1 | 5 | 0.35 | 2 | 0.55 | 1700 | 6 | 2 | 0 | 0.47 |
| 1.A | [700000000000000] | 7-6 | 0.1 | 5 | 0.35 | 2 | 0.55 | 1700 | 4 | 3 | 0 | 0.605 |
| 1.C | [000000000012000] | 12-18 | 0.1 | 5 | 0.35 | 2 | 0.55 | 1700 | 4 | 3 | 0 | 0.605 |

FIG. 18

| INDEX: IDV | CHROMOSOME | SWAPPINGS | W_SW | NO TIE SWITCHES BASE | W_MO | NO CURRENT VIOLATIONS BASE | W_SHED | LOAD BASE | NO SWITCH OPERATIONS (IDV) | NO CURRENT VIOLATIONS (IDV) | UNSERVED LOAD (IDV) | FITNESS FUNCTION F(IDV) |
|---|---|---|---|---|---|---|---|---|---|---|---|---|
| 2.A | [0000000000012] | 12-24 SAME AS 1.B | 0.1 | 5 | 0.35 | 2 | 0.55 | 1700 | 4 | 1 | 0 | 0.255 |
| 2.B | [00017000000000] | 9-17 SAME AS 1.G | 0.1 | 5 | 0.35 | 2 | 0.55 | 1700 | 4 | 1 | 0 | 0.255 |
| 2.C | [000002000120000] | 11-12, 16-20 SAME AS 1.E | 0.1 | 5 | 0.35 | 2 | 0.55 | 1700 | 6 | 0 | 500 | 0.281764706 |
| 2.D | [00300000000000] | CROSSOVER 1.B WITH 1.G | 0.1 | 5 | 0.35 | 2 | 0.55 | 1700 | 6 | 0 | 0 | 0.12 |
| 2.E | [0000020000012] | CROSSOVER 1.B WITH 1.E | 0.1 | 5 | 0.35 | 2 | 0.55 | 1700 | 6 | 4 | 0 | 0.82 |
| 2.F | [003170000000] | MUTATE 1.H | 0.1 | 5 | 0.35 | 2 | 0.55 | 1700 | 6 | 1 | 0 | 0.295 |
| 2.G | [00000000120000] | MUTATE 1.F | 0.1 | 5 | 0.35 | 2 | 0.55 | 1700 | 4 | 0 | 0 | 0.255 |

FIG. 19

RESTORATION SWITCHING ANALYSIS WITH MODIFIED GENETIC ALGORITHM

CROSS REFERENCE TO RELATED APPLICATIONS

This application is a 35 U.S.C. §371 national stage filing of International Application No. PCT/US2010/058759, filed Dec. 2, 2010, which claimed the benefit of and priority to U.S. Provisional Patent Application Ser. No. 61/266,642, filed Dec. 4, 2009. The complete disclosures of the above-identified patent applications are hereby incorporated by reference for all purposes.

BACKGROUND

An electric power distribution system generally consists of a set of distribution substations, feeders, switches (circuit breakers, reclosers, etc.) electrical loads, and monitoring and control devices. A distribution system delivers electricity from distribution substations via feeders and switches to electrical loads (customers) that connect to feeders. Feeders in a distribution system are usually configured in a radial type to ensure that each load is supplied by only one distribution substation (source) via one feeder at any instant. To maintain the radial configuration, each feeder is linked by normally open (NO) tie-switches to neighboring feeders. The feeder section that is relatively near/far to its source is referred to as upstream/downstream section, while comparing to the feeder section that is relatively far/near to its source. One or more switches in the distribution system may have an associated intelligent electronic device (IED) that has the following monitoring and control functions: (1) measuring and recording electrical and other types of switch related quantities, such as voltage, current, reclosing times (2) monitoring the switch status, (3) operating the switch between open or close, and (4) communicating information to one or more master devices.

Distribution system reliability can be greatly improved by automating feeder operations such as fault detection, isolation, and load restoration. In such systems, IEDs associated with switches monitor the distribution system and communicate the corresponding information to the feeder automation master controllers located in substations. If a fault occurs in the distribution system, the master controller identifies the fault location, generates fault isolation and service restoration solutions in terms of a sequence of switch operations, and sends switching commands to IEDs to control corresponding switches.

An example distribution network is shown in FIG. 1, in a normal operation mode wherein loads are omitted for simplicity, sources (S1 to S7) are oval shaped, NO switches (5, 10, 13, 16, 19, 24, 29) are square shaped, with a diagonal hatch pattern, and normally closed (NC) switches (other numbers) are square shaped, with a vertical hatch pattern. If a fault occurs between switch 1 and 2, the protection function of switch 1 causes switch 1 to open, thereby causing the dashed line circled area to lose power. The boundary switches of the faulted portion of the distribution network include switch 1 and 2. Switch 2 is immediately downstream of the faulted section and thus, is the isolation switch. With reference to FIG. 2, when switches 1 and 2 are open, the faulted portion is isolated and a remaining unserved area is bound by isolation switch 2 and NO switches 5 and 16.

Switches 5 and 16 are referred to as first layer (Layer 1) restoration switches. If the sources, in this case S4 and S7, respectively, can provide power to the area that is left unserved due to fault isolation, a first layer restoration solution is possible. If the first layer sources are not capable of providing power to the unserved area, second or even third layer solutions must be performed to provide power to the unserved area. For example, the power sources for layer 2 are S2 and S5. The power sources for a third layer solution are S3 and S6. As should be evident, the second and third layer restoration switches are topologically more "distant" than the first layer restoration switches.

The process to obtain a restoration solution beyond layer 1 is called multi-layer (or multiple-layer) restoration service analysis (RSA). This is sometimes also referred to as a multi-tier service restoration problem. Due to the potentially large number of switches involved in a multi-layer restoration solution, the process to obtain such solution is generally more challenging than a single-layer solution. With any reconfiguration problem it is desirable to achieve: computational efficiency, maximum number of restored loads, avoiding network violations, minimized switching operations and radiality of the restored network topology.

Network reconfiguration problems may also seek to reduce the overall system loss and relieve overloading conditions in the network. Therefore, a network reconfiguration problem may either be formulated as a loss reduction optimization problem or a load balancing optimization problem. Under normal system operation conditions, network configuration allows the periodical transfer of load from heavily loaded portions of the distribution network to relatively lightly loaded ones, and thus takes advantage of the large degree of load diversity that exists in many distribution systems. Under abnormal system operation conditions, such as planned or forced system outages, the network reconfiguration problem becomes a service restoration problem, which is a special load balancing problem, where the main objective is to restore as many out-of-service loads as possible, without violating system operating and engineering constraints.

As with any other type of network reconfiguration problem, service restoration is a highly complex combinatorial, non-differential, and constrained optimization problem, due to the high number of switching elements in a distribution network, and the non-linear characteristics of the constraints used to model the electrical behavior of the system.

There is therefore a need in the art for a restoration switching analysis method that properly accounts for a greater number of variables and effectively processes multiple-layer RSA solutions.

SUMMARY OF THE INVENTION

According to one aspect of the invention, a method is provided for determining back-feed paths to out-of-service load areas in a network after fault isolation. The method includes determining a base network state and determining baseline values of a fitness function for the base network state. A chromosome list is initialized. Initial chromosomes are created, and for each created initial chromosome, if valid and not in list, the initial chromosome are added to an initial chromosome population and to the chromosome list. A fitness function value is generated for each chromosome in the initial chromosome population. The chromosomes are sorted by fitness function value, the chromosome having the lowest fitness function value being the best candidate chromosome. If the fitness function value of the best candidate chromosome is below a threshold fitness value, a network configuration corresponding to the best candidate chromosome is output. If the fitness function value of the best candidate chromosome is not below the threshold fitness value, genetic manipulation is used to create new chromosomes for a new chromosome population. During the creation of the new chromosome population, any new chromosomes already in the chromosome list are rejected. New chromosomes in the new population are added to the chromosome list. New generations are created until the fitness function value of the best candidate chromosome is below the threshold fitness value or until a predetermined number of new populations are created, whereupon a network configuration corresponding to the best candidate chromosome is output.

BRIEF DESCRIPTION OF THE DRAWINGS

FIG. 11 is a table showing fitness function values for the base network state.

FIG. 18 is a table showing the fitness function values for the first generation.

FIG. 19 is a table showing the fitness function values for the second generation.

DETAILED DESCRIPTION OF THE INVENTION

Figure 1:
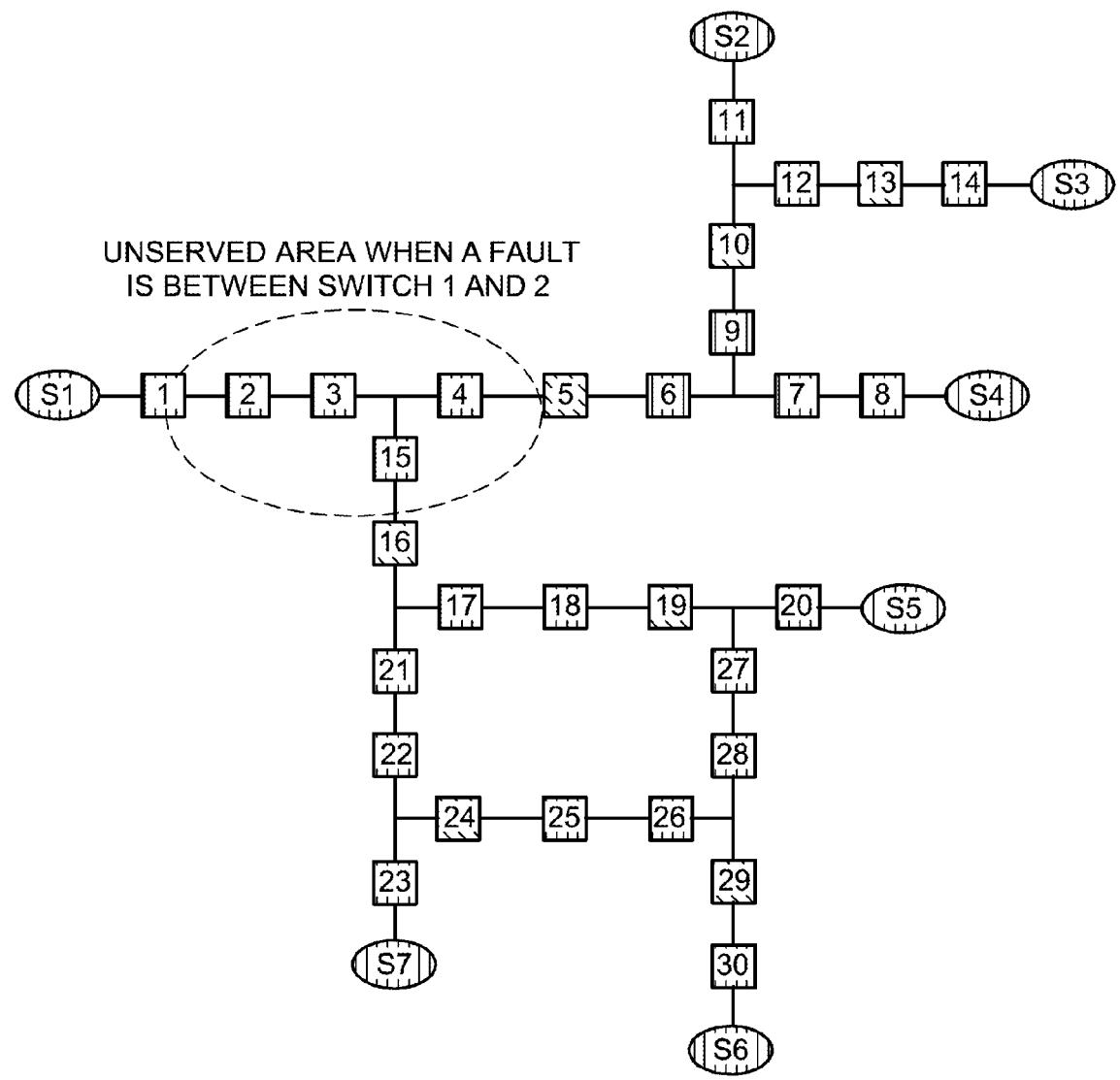
FIG. 1 is a schematic drawing of an exemplary electrical distribution network.
Figure 2:
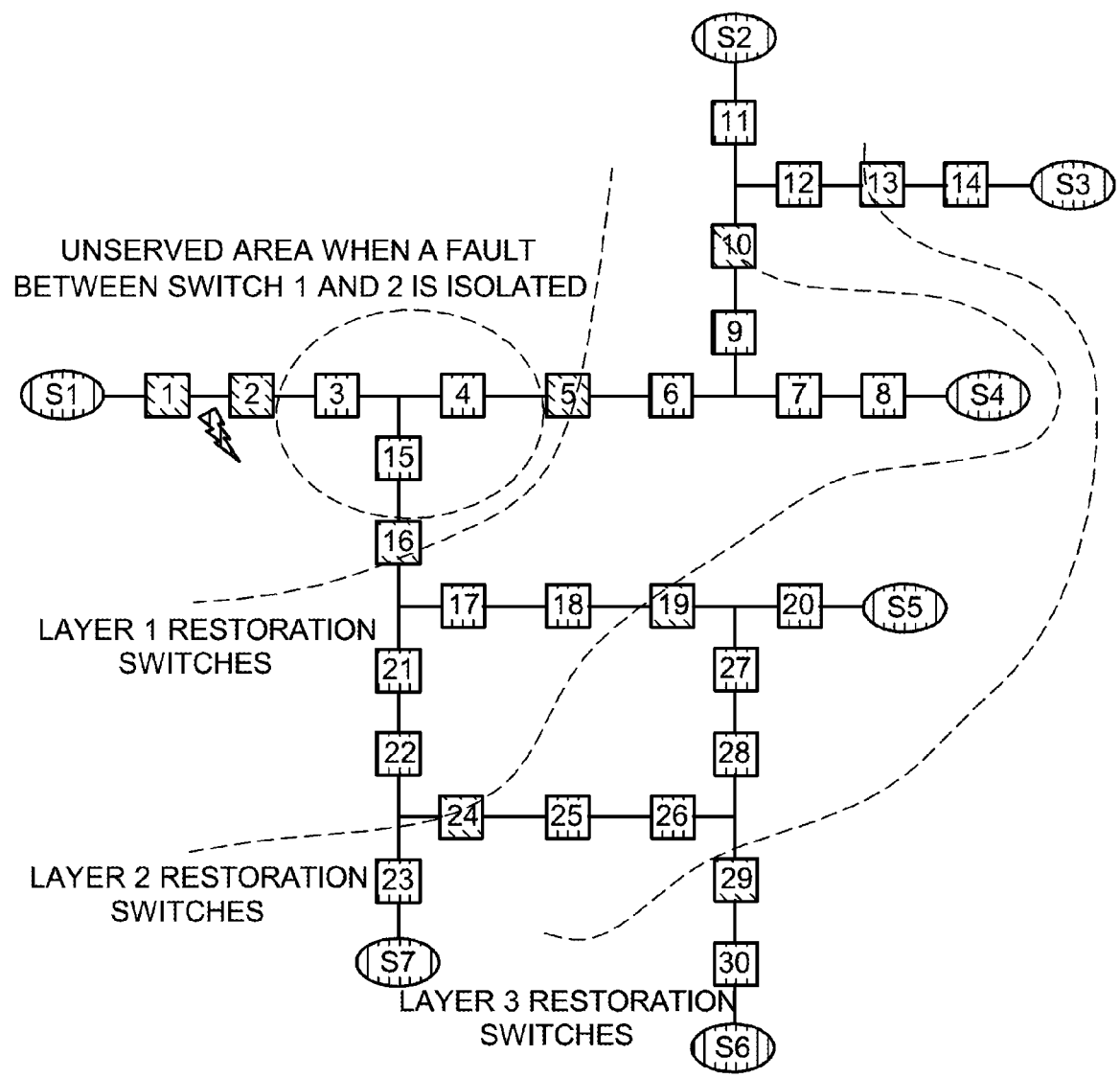
FIG. 2 is a schematic drawing of an exemplary electrical distribution network wherein a fault has occurred and displaying the various restoration layers.
Figure 3:
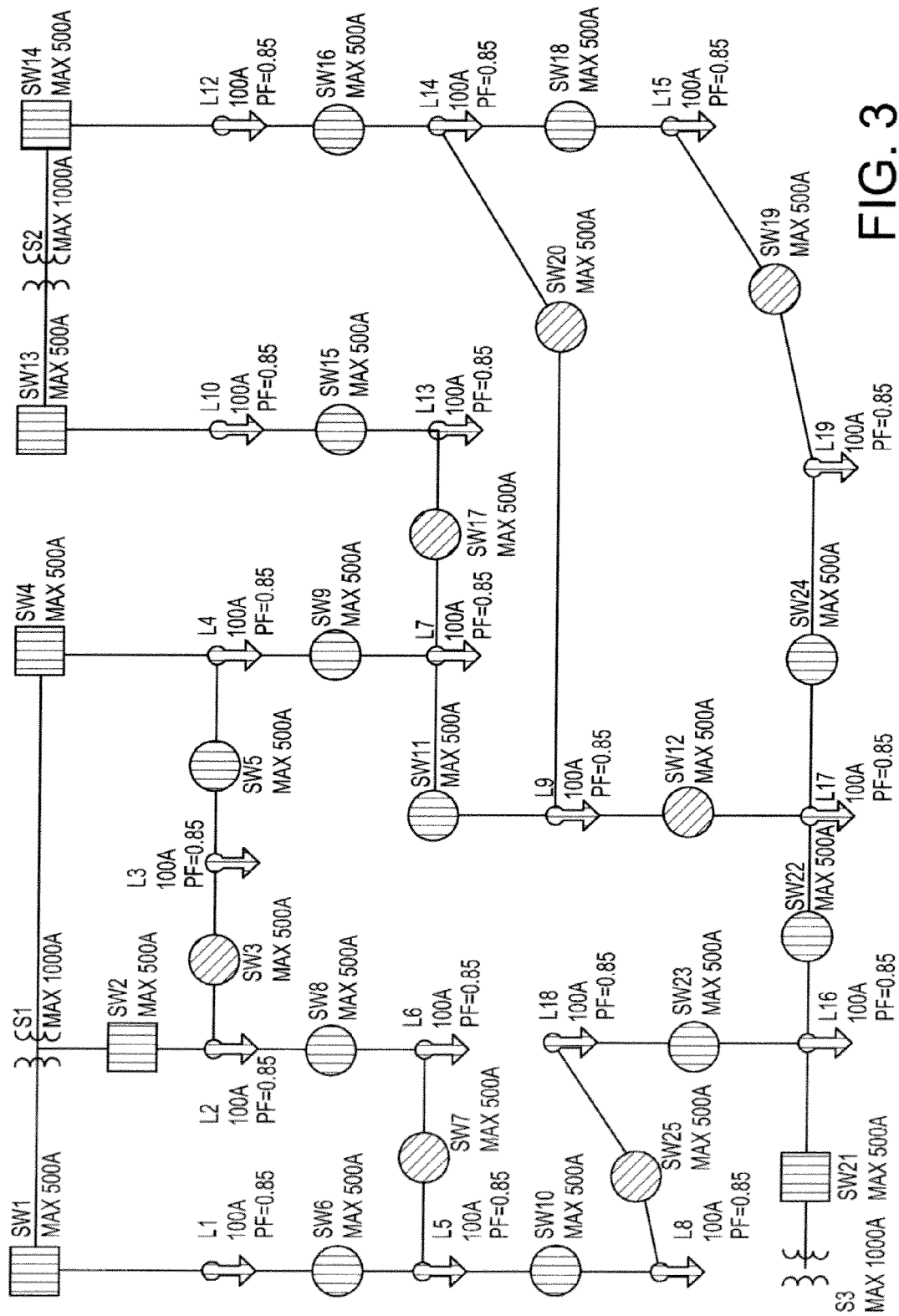
FIG. 3 is a schematic drawing of a second exemplary distribution network.

The methods of the present invention are principally applicable to multi-layer RSA problems, however, it should be appreciated that the methods may also be applicable to single layer RSA problems. For example of a single-layer RSA problem, reference is made to FIG. 3, which shows an exemplary network in a pre-fault configuration, including three sources S1, S2, and S3 (transformer shaped); 6 feeder breakers SW1, SW2, SW4, SW13, SW14 and SW21 (square shaped, with a vertical hatch pattern); 12 normally closed (NC) switches (sectionalizing switching devices) SW6, SW8, SW5, SW9, SW10, SW11, SW15, SW16, SW18, SW22, SW23 and SW24 (circle shaped, with a vertical hatch pattern); and 7 normally open (NO) tie switches SW3, SW7, SW17, SW12, SW19, SW20 and SW25 (green circle shaped, with a vertical hatch pattern).

Figure 4:
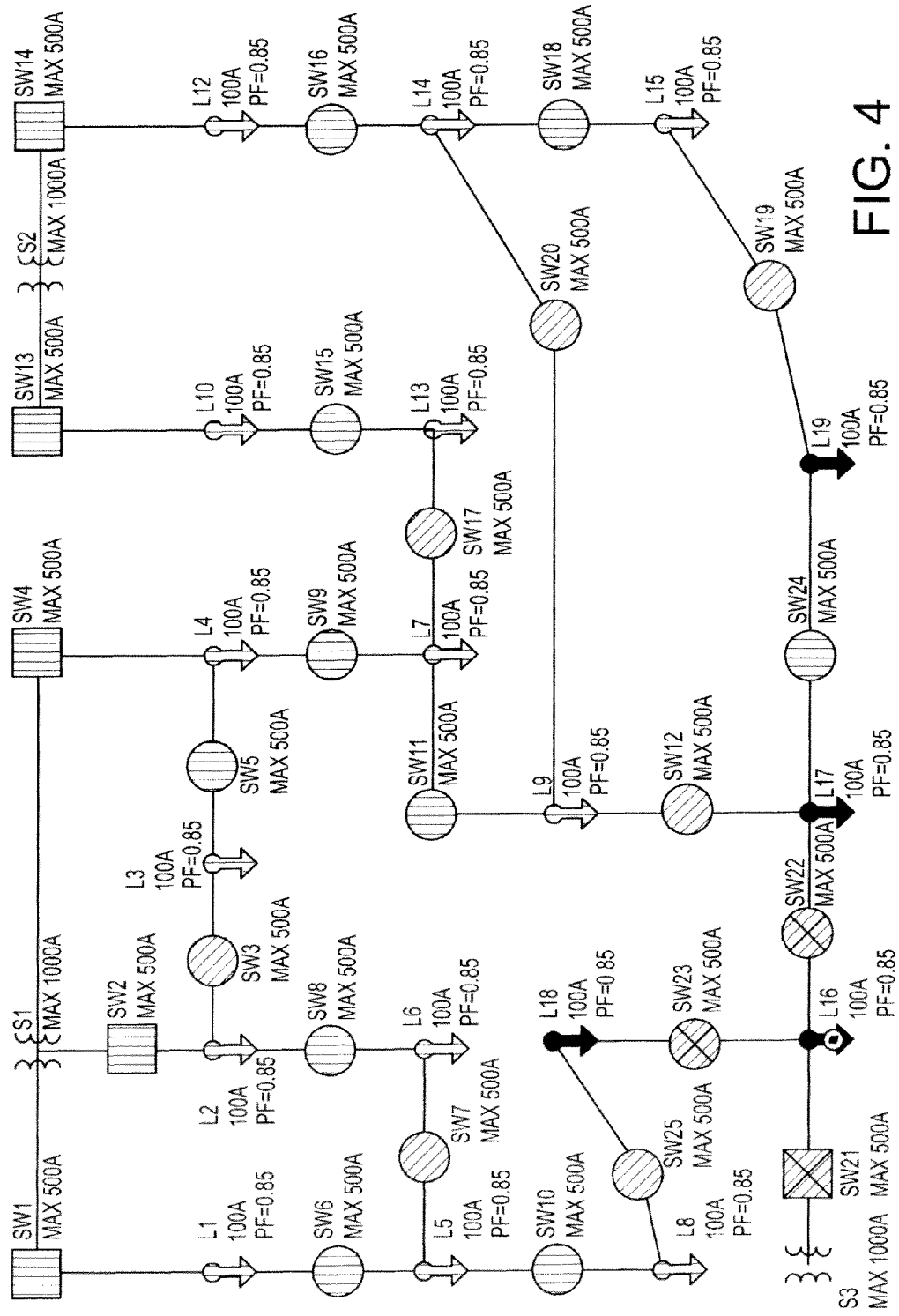
FIG. 4 is a schematic drawing of the distribution network of FIG. 3 wherein a fault is isolated.

With reference to FIG. 4, a post-fault network configuration is shown, wherein a fault occurred at node L16 of the distribution network which was isolated by feeder breaker SW21 and switch (sectionalizer) SW22/SW23. In this post-fault configuration, two load areas are un-served or out-of-service. A first area includes a single load L18. The second area includes load nodes L17 and L19. Power may be restored to the first area via NO tie switch SW25, and to the second area via NO tie switch SW12 and/or SW19 (in case there is not enough available capacity from either SW12 and SW19, the out-of-service network L17 and L19 may be split into two to be restored by both SW12 and SW19). This restoration scheme is called the back-feed restoration because the power is restored from alternative sources.

Analysis of the problem begins by defining the number of out-of-service load areas as M, and the areas are identified by $DE_i$ ($1 \leq i \leq M$); the number of back-feed NO tie switches to $DE_i$ are defined as $M^i_{tsw}$, and the tie switches are identified by $TSW_{i,k}$ ($1 \leq k \leq M^i_{tsw}$). In the exemplary post-fault network of FIG. 4, $DE_1$ corresponds to load node L18, $DE_2$ corresponds to load nodes L17 and L19; $M^1_{tsw}=1$ and $M^2_{tsw}=2$; $TSW_{1,1}$=SW25, $TSW_{2,1}$=SW12 and $TSW_{2,2}$=SW19.

The unique fitness function is also defined, wherein the objective is to minimize the value of this function:

$$f(idv)=w_{sw}SwOp_{nr}(idv)+w_{loss}SysLoss_{nr}(idv)+w_{Vvio}Vvio_{nr}(idv)+w_{Ivio}Ivio_{nr}(idv)+w_{shed}(P_{nr}(idv)) \quad \text{(Eq. 1)}$$

Where idv is the index of the individual network topology (hereafter the candidate system) to be evaluated (corresponds to the chromosomes generated in the genetic algorithm below). $SysLoss_{nr}$ is the corresponding normalized system power loss, $Vvio_{nr}$ is the number of voltage violations, $Ivio_{nr}$ is the number of current violations, $SwOp_{nr}$ is the number of switching operations and $P_{nr}$ is the total unserved load after restoration. The corresponding weighting factors are represented by $w_{loss}$, $w_{Vvio}$, $W_{Ivio}$, $W_{Sw}$, $W_{shed}$. The weighting factor definition in Eq. 1 allows the users of this algorithm to place an emphasis on different optimization variables, thereby increasing the application flexibility. It should be appreciated that, though the above fitness function is well suited for the present invention, fewer or additional factors may be considered in a fitness function depending on user priorities and required calculation speeds.

As the objective is to minimize the fitness value, the calculation of the normalized values is defined according to the following:

$$SysLoss_{nr}(idv)=SysLoss(idv)/SysLoss_{base} \quad \text{(Eq. 2)}$$

$$Vvio_{nr}(idv)=NoVoltViolations(idv)/NoVoltViolations_{base} \quad \text{(Eq. 3)}$$

$$Ivio_{nr}(idv)=NoCurrentviolations(idv)/NocurrentViolations_{base} \quad \text{(Eq. 4)}$$

$$SwOp_{nr}(idv)=NoSwitchOperations(idv)/NoTieSwitches_{base} \quad \text{(Eq. 5)}$$

$$P_{nr}(idv)=UnservedLoad(idv)/Load_{base} \quad \text{(Eq. 6)}$$

Where SysLoss is the aggregated total power loss of the candidate system, NoVoltViolations is the counted number of voltage violations in the candidate system, NoCurrentViolations is the number of current (capacity) violations in the candidate system, NoSwitchOperations is the number of switch operations needed for the transition from the fault isolated system state to the candidate system state, UnservedLoad is the aggregated out-of-service load in the candidate system. $SysLoss_{base}$, $NoVoltViolations_{base}$, $NoCurrentViolations_{base}$, $NoTieSwitches_{base}$, and $Load_{base}$ and are the baseline values for the normalization, and are of a base candidate system that will be hereinafter described below.

The determination of a voltage violation is influenced by the settings of upper and lower voltage limits. Each element in the system (source/switch/load) has voltage limits associated with them. These voltage limits are usually known (rated values), and can be assumed to be fixed for different candidate systems. When the per unit (p.u.) voltage values are used for these fixed limits, the calculated $Vvio_{nr}$ for each candidate system is comparable with each other.

In the calculation of UnservedLoad in Eq.6, individual load may have different priority indices (or penalty factors) associated with them. More critical load can have higher penalty factors in the calculation. For example, most critical loads may have a penalty factor of 3, loads with medium criticality may have a penalty factor of 2, and normal or low criticality loads may have a penalty factor of 1. When these penalty factors are multiplied with their associated load in the calculation, the more critical the load, the greater impact it will have on the final $P_{nr}$ value. This ensures that the more critical load is less likely left unserved in the selection decision of the candidate systems.

A pure genetic algorithm may generate duplicate candidate networks which increase process time and reduce computation efficiency. Thus, a Reactive Tabu Search (RTS) is incorporated, by defining a search list $LST_{RTS}$ that contains the indices of the candidate networks and invalid networks. The indices primarily contain information of the network configuration, that is, the statuses of each switch/breaker in terms of whether they are open or closed.

The method of the present invention is performed after fault isolation and proceeds according to the following steps:

At a first step, for each $DE_i$, spare capacity $I_{i,k}^{tsw}$ is calculated for each corresponding tie switch $TSW_{i,k}$ ($1 \leq k \leq M^i_{tsw}$). The spare capacity is the corresponding back-feed path's maximum spare loading capability, which is determined by tracing from the tie switch to its source, finding the lowest spare loading (current) limit for each element in that network path, and setting the lowest limit as the spare capacity. For a feeder main or lateral, the spare capacity limit is the thermal current-carrying limit minus the present loading (current); for a switch, the capacity limit is the rated AC loading capability (in amperes) minus the present loading (current); for a source, the capacity limit is the maximum available loading capacity (this value could be the thermal or stability constrained loading capacity minus the present loading).

In a next step, for each out-of-service load area $DE_i$, close the NO tie switch $TSW_{i,k_{Imax}}$ which has the maximum $I_{i,k}^{tsw}$ among its peers (for $1 \leq k \leq M^i_{tsw}$). The resulting network configuration is radial and includes no out-of-service loads (current and voltage violations may still exist). This configuration is the base candidate system and its representative index is stored in the $LST_{RTS}$. The representative index may be defined as a string that consists of indices of the selected tie switches $TSW_{i,k_{Imax}}$. The base candidate system index thus becomes a string of tie switch indices.

A load flow (network) analysis is then performed on the base candidate system to calculate the total system loss $SysLoss_{base}$, number of voltage violations $NoVoltViolations_{base}$, number of current violations $NoCurrentViolations_{base}$, number of tie switches $NoTieSwitches_{base}$, and the total system load $Load_{base}$. The fitness value of the base candidate system is calculated according to Eq. 1, and equals to $W_{Sw}+w_{loss}+w_{Vvio}+w_{Ivio}+w_{shed}$.

Figure 5:
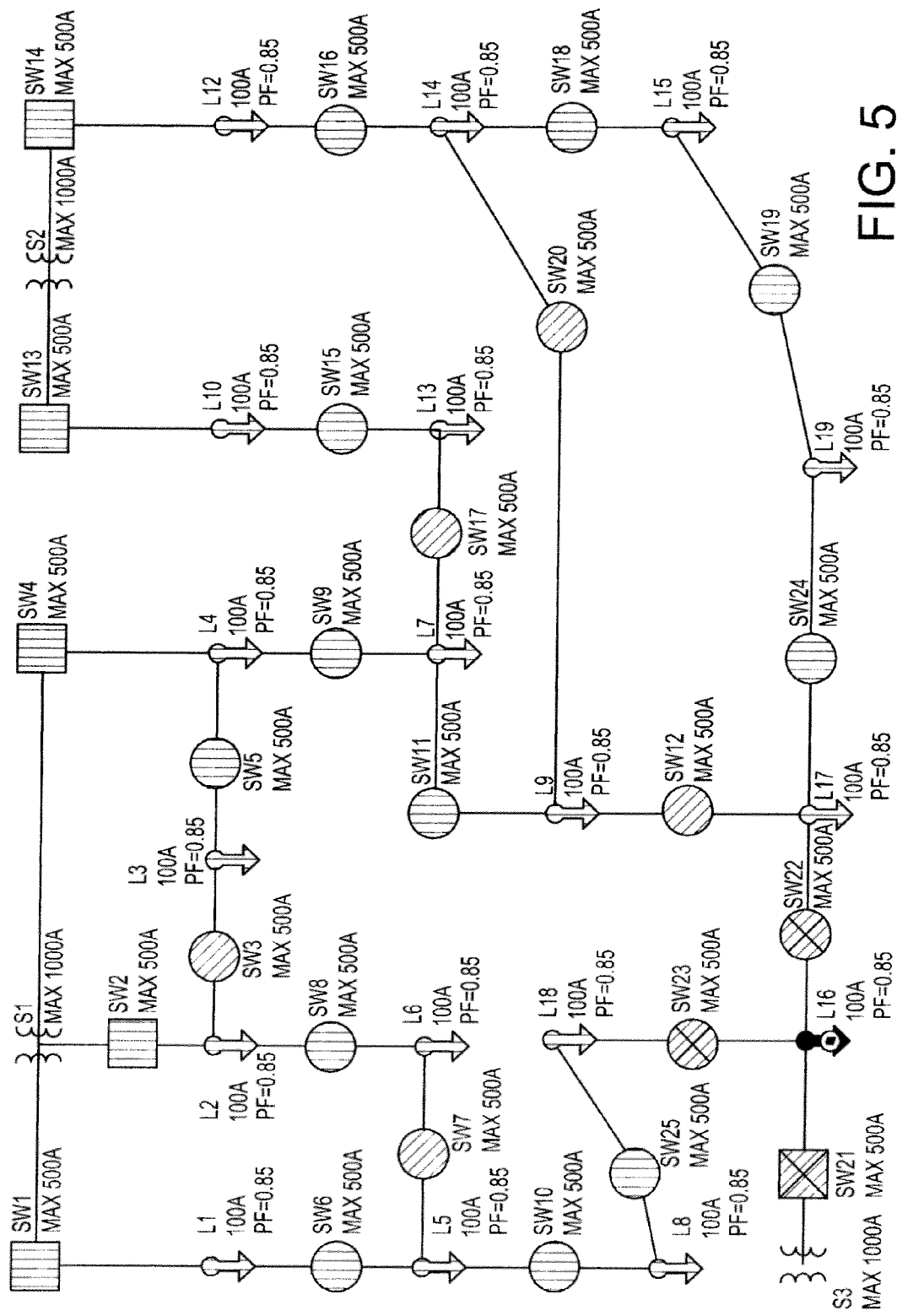
FIG. 5 is a schematic drawing of the distribution network of FIG. 3 wherein the out-of-service areas are back-fed.

By way of example, with reference to FIG. 5, the base candidate system is shown for the faulted network of FIG. 4. As can be seen, for $DE_1$, SW25 is the NO tie switch $TSW_{1,1}$, which has the maximum $I_{1,1}^{tsw}$ (which is 200 A, i.e. the maximum loading capacity of SW1 500 A minus the present SW1 loading of 300 A). Likewise, for $DE_2$, SW19 is the NO tie switch $TSW_{2,2}$ which has the maximum $I_{2,2}^{tsw}$ (which is also 200 A, i.e. the maximum loading of SW14 500 A minus the present SW14 loading of 300 A). Other approaches to defining the base candidate system may be employed without impacting the operation of the present invention.

In a next step, for the base candidate system, swap $TSW_{i,k}$ ($k \neq k_{max}$) with upstream closed switches using a genetic algorithm (GA) technique to generate new candidate systems. In the present disclosure, swapping refers to the action of closing the $TSW_{i,k}$ ($k \neq k_{max}$) and opening an upstream NC switch. This approach will be described in greater detail below.

Generally, feeder circuit breakers ({1, 2, 4, 13, 14} for the example network in FIG. 5) may not be swapped, as it is unusual to use them as new tie switches and this also conveniently limits the size of the searching space. Multiple swaps may take place in a given candidate system, but no valid solutions can include an energized loop. In other words, candidate systems must be radial. De-energizing portions of the network are allowable, as the fitness function definition will naturally tend to exclude the corresponding candidate network, i.e. the GA will minimize load shedding if $w_{shed}$ is greater than zero in Eq. 1. Each newly generated candidate system is checked against the $LST_{RTS}$, and if it is already in the list, the candidate system is discarded. If the candidate system is not in the list, its index is stored in the list. For each new candidate system, a fitness value is calculated based on Eq. 1 to Eq. 6, and used in the GA evolution process and termination assessment, as will be described below in greater detail.

The swapping function will now be described in greater detail. In order to define the chromosomes for the genetic algorithm, a swap matrix structure is defined, wherein rows correspond to NO tie switches (index only), and columns correspond to upstream NC switches (index only) that can be swapped. In the matrix, the value 1 indicates a swap is possible and a value 0 indicates a swap is not possible. An example swap matrix for the base candidate system of FIG. 5 is shown below:

TABLE 1

Chromosome Matrix

| | 6 | 8 | 5 | 9 | 15 | 16 | 10 | 11 | 18 | 25 | 19 | 24 | ← indices of NC switches |
|---|---|---|---|---|---|---|---|---|---|---|---|---|---|
| 3 | 0 | 0 | 1 | 0 | 0 | 0 | 0 | 0 | 0 | 0 | 0 | 0 | |
| 7 | 1 | 1 | 0 | 0 | 0 | 0 | 0 | 0 | 0 | 0 | 0 | 0 | |
| 17 | 0 | 0 | 0 | 1 | 1 | 0 | 0 | 0 | 0 | 0 | 0 | 0 | |
| 20 | 0 | 0 | 0 | 1 | 0 | 1 | 0 | 1 | 0 | 0 | 0 | 0 | |
| 12 | 0 | 0 | 0 | 1 | 0 | 1 | 0 | 1 | 1 | 0 | 1 | 1 | |

↑ Indices of NO switches

Based on the swap matrix, the GA chromosome structure may be defined. Each upstream NC switch can take a value (index of its downstream $TSW_{i,k}$) out of its corresponding value set, where 0 means no swap, and values other than 0 means a swap is possible with the tie switch. Table 2 shows a plurality of upstream NC switches (Line 1) and the structure and value set definition (Line 2) corresponding thereto. In this manner, Table 2 shows the chromosome definition of the genetic algorithm for the base candidate system in FIG. 5.

TABLE 2

Chromosome Definition of the Genetic Algorithm

| SW6 | SW8 | SW5 | SW9 | SW15 | SW16 | SW10 | SW11 | SW18 | SW25 | SW19 | SW24 |
|---|---|---|---|---|---|---|---|---|---|---|---|
| 0, 7 | 0, 7 | 0, 3 | 0, 17, 20, 12 | 0, 17 | 0, 20, 12 | 0 | 0, 20, 12 | 0, 12 | 0 | 0, 12 | 0, 12 |

Based on this chromosome structure definition, chromosomes of the candidate systems can be generated and the systems evaluated. A chromosome is a concise mathematical representation of the network with a given combination of swaps and is represented in the form of a string of indices of the swaps, with details below. For instance, chromosome [0 0 0 0 0 20 0 12 0 0 0 0] represents that beginning at the base network state, SW16 is swapped with SW20, and SW11 is swapped with SW12 to generate a new candidate network configuration. In this new network configuration, S20 and SW12 are the new tie switches. The 0's in a chromosome mean that no swapping is done for that corresponding switch. A chromosome with all 0s will be naturally excluded because it is the base network and already in the $LST_{RST}$. Note that the swapping combinations can be randomly chosen from the set of possible swaps. That is, for instance, SW16 can be swapped randomly with SW20 or SW12, or not swapped at all, but not with any other normally closed switches.

Figure 6:
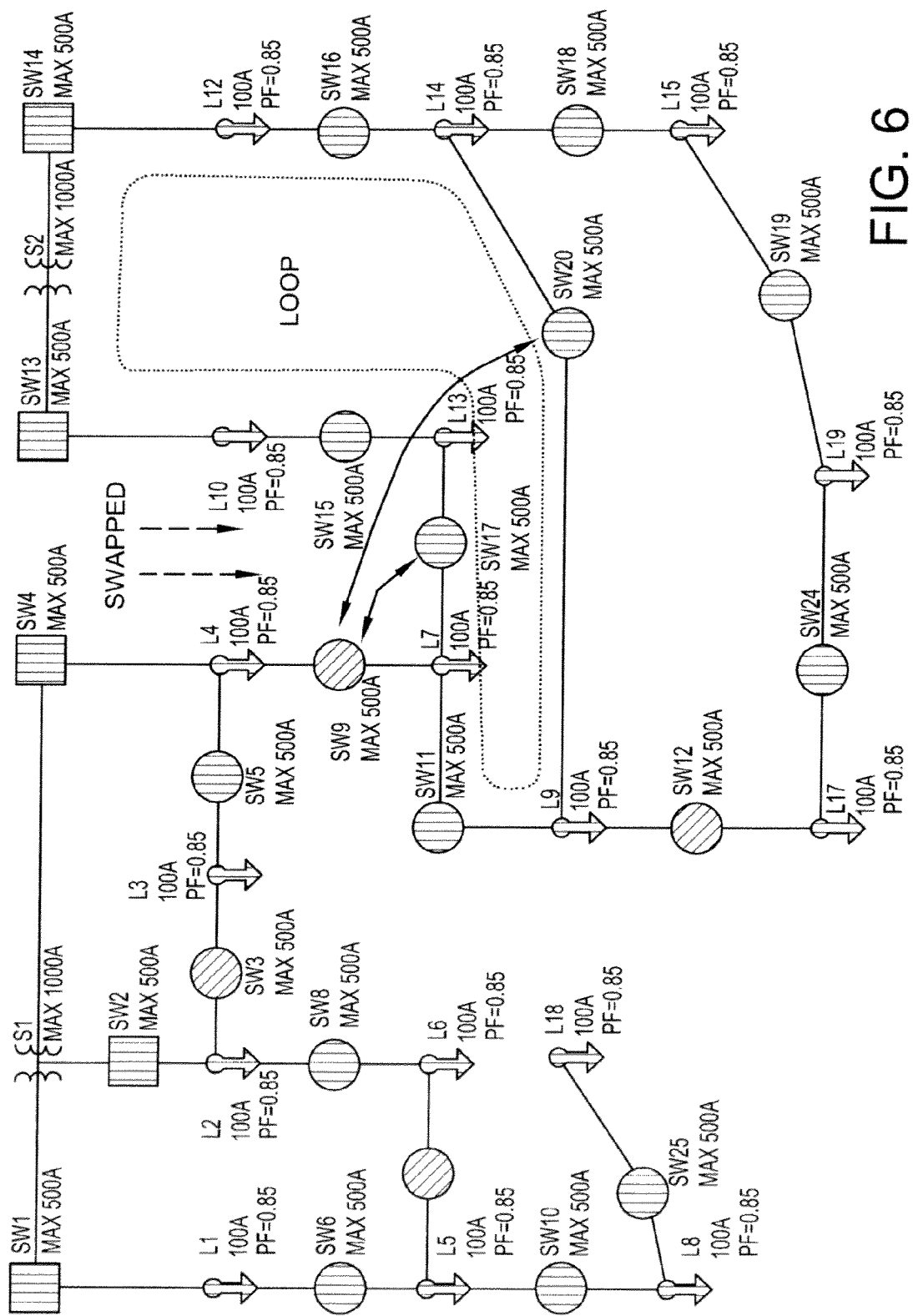
FIG. 6 is a schematic drawing of the distribution network of FIG. 3 wherein swapping creates an energized loop.
Figure 7:
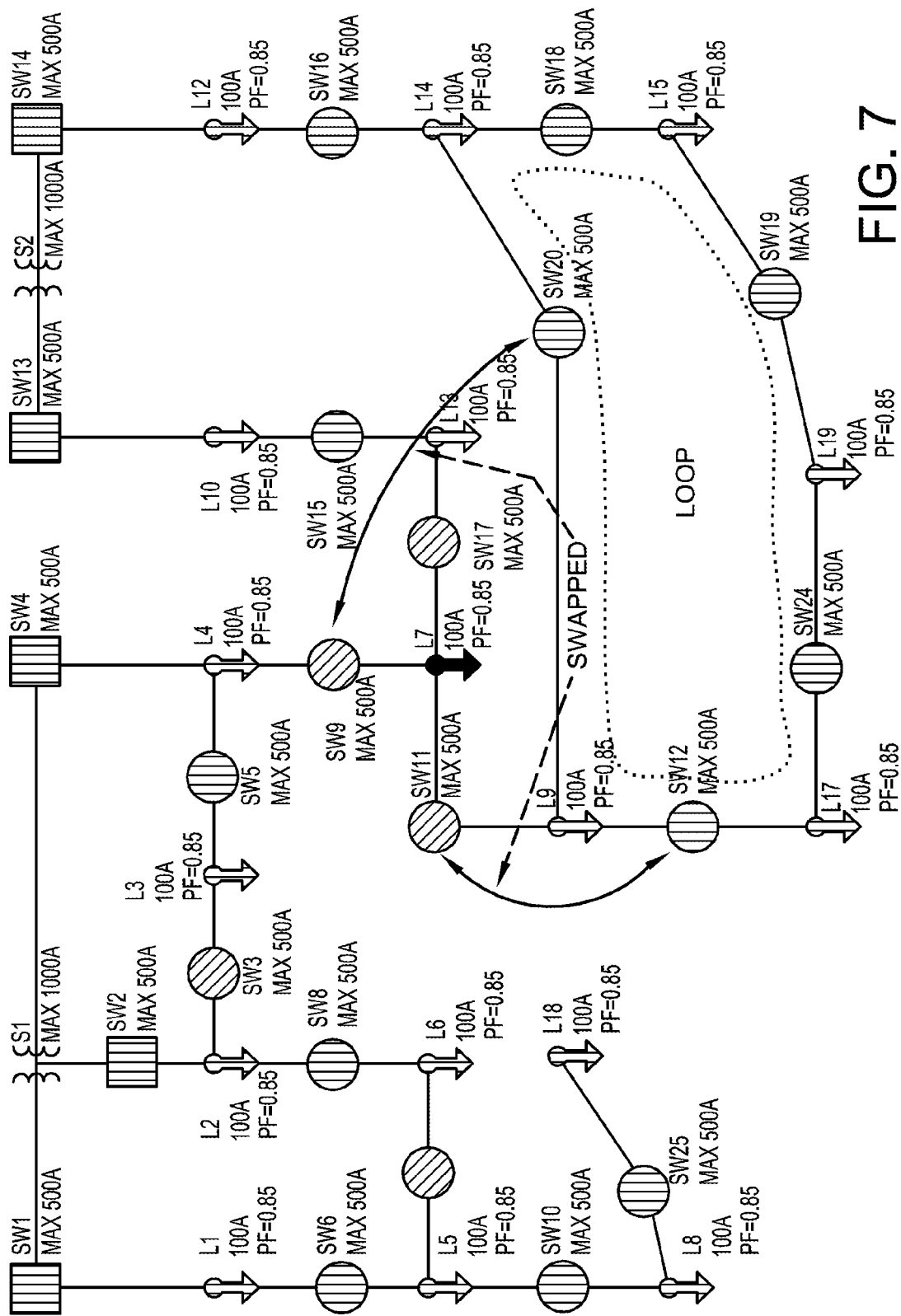
FIG. 7 is a schematic drawing of the distribution network of FIG. 3 wherein swapping creates an energized loop.

When more than one tie switch swaps with the same upstream switch, an energized network loop will be generated. However, by design, there is naturally no corresponding chromosome generated. For example, with reference to FIG. 6, (for simplicity, the faulty load area and forward-feed restoration portions of the network is not shown) for the base candidate system in FIG. 5, if both SW17 and SW20 are swapped with SW9, (i.e. SW17 and SW20 are closed and SW9 is open), the resulting network includes an energized network loop and a chromosome should not be generated for it. Because the chromosome structure only allows an upstream switch to take one downstream switch's index value in a chromosome, the circuit does not have a corresponding chromosome that can be generated. FIG. 7 provides another example, where an energized loop is generated, but no corresponding chromosome can be generated.

Because load shedding is minimized using the fitness function definition, there is no need to check at the front end if a newly generated chromosome may result in portion of the network be de-energized. However, because the evaluation of each valid chromosome needs the load flow analysis, to improve the speed of the algorithm, according to one embodiment, this check could be carried out before designating a newly generated chromosome to represent a valid candidate system.

Figure 8:
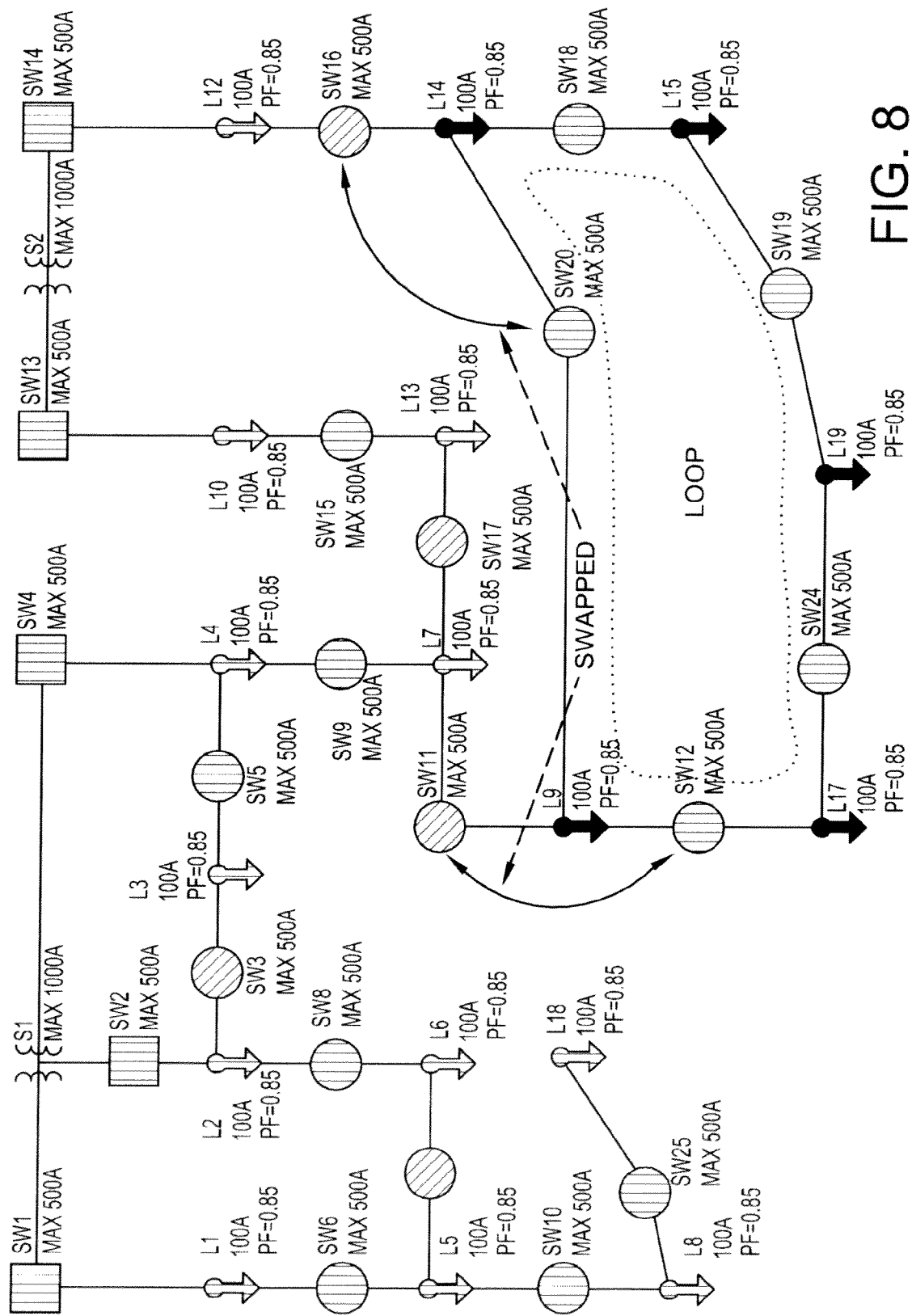
FIG. 8 is a schematic drawing of the distribution network of FIG. 3 wherein swapping creates a deenergized loop.

For example, with reference to FIG. 8, for the base candidate system in FIG. 5, when SW11 is swapped with SW12, and SW16 is swapped with SW20, the resulted network has a de-energized loop portion. The corresponding chromosome is valid and may be generated as [0 0 0 0 0 20 0 12 0 0 0 0] but it should be discarded as it results in a deenergized loop and put into the $LST_{RTS}$. Network tracing is used to identify deenergized loops in the resulting network. If the deenergized loops are identified, the corresponding chromosome is discarded and not used in the fitness value evaluation analysis thereafter.

The dimension of the solution space, i.e. the total number of possible network configurations, can be calculated by multiplying the value set dimensions of all the NC switches.

Thus, in the example network of FIG. 5, the value set dimensions (shown in Table 2) are 2*2*2*4*2*3*1*3*2*1*2*2=4, 608 possible network configurations. During the execution of the GA analysis, the algorithm should be terminated gracefully, that is, it should always produce a solution that is better than or identical to the base candidate solution, and should not take too long for its analysis to avoid interference with real-time execution. In order to achieve this, the total number of chromosomes of valid candidate systems are preferably a small portion (for example, 10% or smaller) of its dimension. For example, 1% of the solution space dimension, or an absolute number, such as 10, whichever is bigger, may be used as the limit to terminate the GA in case the fitness function value cannot be reduced to less than a pre-defined $\epsilon$. In other words, it is ensured that a limited number of chromosomes are created, based on a fixed value (e.g. at least 10) or a percentage of the total solution space dimension (e.g. 10% of the solution space).

Once the population of the first generation valid chromosomes is generated by random swapping as described above, a set of N individual chromosomes (each chromosome may take the form, for example, [0 0 0 0 0 20 0 12 0 0 0 0]) is formed. A winning chromosome is selected via fitness function evaluation, and the generation of GA offspring via crossover and mutation of chromosomes. More specifically, fitness function evaluations are performed once the chromosomes are created, using the ones which are not rejected due to energized/deenergized loops and non-radial network configurations. As is known in the art, a crossover is accomplished by merging any two generated chromosomes randomly and mutations are accomplished by randomly redoing one or more of the swappings of a chromosome.

The algorithm is terminated when an acceptable reconfigured network is obtained or the maximum number of valid chromosomes has been attempted. The analysis to determine whether a solution is acceptable is performed by monitoring the reduction in the fitness value and whether it has reduced below a threshold value, which can be obtained as a user-defined parameter setting. The GA results in a best chromosome (and corresponding network configuration) at every generation, even when the process is terminated on the limitation of tried chromosomes.

Figure 9:
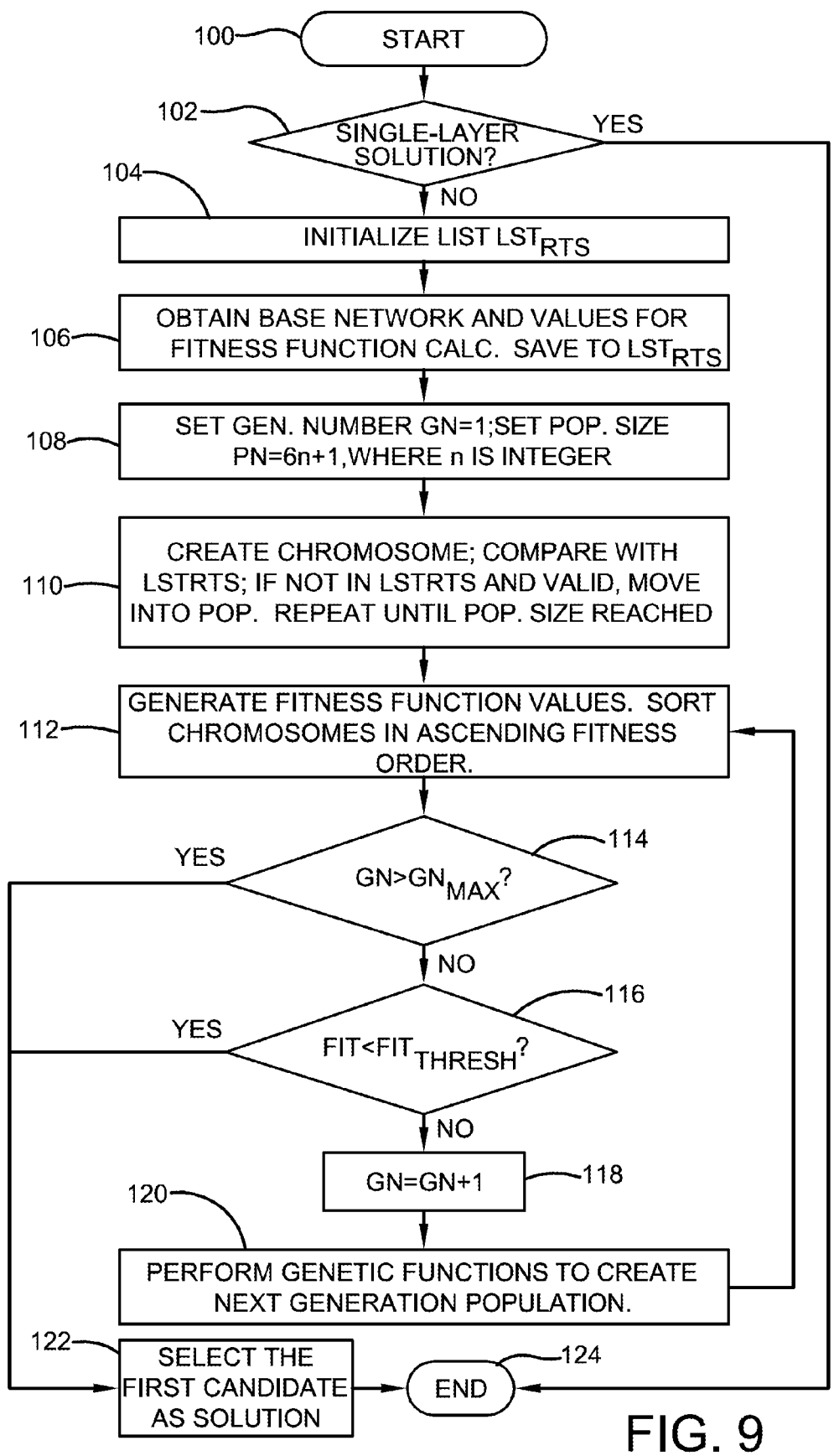
FIG. 9 is a flowchart showing an exemplary embodiment of the algorithm of the present invention.

With reference now to FIG. 9, a flow-chart is shown which discloses the process algorithm according to the present invention. As discussed above, the methods of the present invention are performed after a fault is isolated on a network. Thereafter, the process according to the present invention is evoked at 100. At a first step 102, it is determined whether a single layer solution is obtainable. An exemplary solution strategy for obtaining a single-layer solution is disclosed in U.S. Provisional Application 61/086,175, owned by the assignee of the present invention.

If a single layer solution is not available, the process proceeds to step 104, wherein the Searched Chromosome List $LST_{RTS}$ is initiated. At step 106 the base network is identified in the manner described above. Accordingly, for each out-of-service load area $DE_i$ in the post-fault-isolation network, the NO tie switch $TSW_{i,k_{Imax}}$ which has the maximum capacity $I_{i,k}^{tsw}$ among its peers (for $1 \le k \le M_{tsw}^i$) is closed. In this base network configuration the base values and weightings for the fitness function are identified. The chromosome corresponding to the base network configuration is also saved in $LST_{RTS}$.

At step 108 a generation number GN is initialized to 1. Further, a population number PN is calculated. The population number according to one embodiment is determined by the following equation, PN=6n+1, wherein n is an integer value set by the user. At step 110, a candidate network chromosome is created by the switch swap method described above. The candidate network chromosome is checked against the chromosomes in $LST_{RTS}$ and if a duplicate chromosome already resides in $LST_{RTS}$ the chromosome is not added to the generation population. If the chromosome does not already exist in the $LST_{RTS}$ it is added to the $LST_{RTS}$ and if it is valid (ie. contains no energized loops), it is added to the generation population. This process is repeated until the full population number of chromosomes is reached.

At step 112, the fitness function is evaluated for the networks corresponding to each chromosome in the population. The chromosomes are then sorted in ascending order from lowest (best) fitness value to highest (worst) fitness value. Next at step 114 it is determined if the generation number is greater than a pre-set maximum generation number. If so, the algorithm proceeds to step 122 wherein the chromosome with the lowest fitness value is selected as the multi-layer restoration solution. In this manner, a limit is placed on the number of iterations that process will cycle through.

If the generation number is less than the pre-set maximum generation number, the process proceeds to step 116, wherein it is determined if the lowest fitness value in the generation population is below a fitness threshold value. If it is below the fitness threshold value, the network configuration corresponding to that chromosome is determined to be a good solution and the algorithm proceeds to step 122. If at step 116 it is determined that the lowest fitness function value of the generation population is not below the fitness threshold, the algorithm proceeds to step 118, wherein the generation number is incremented by 1. At step 120, a new population is created for the new generation. The new generation is created using genetic functions as described below.

According to one embodiment, the new generation is populated according to the following sequence. The top 2n+1 chromosomes from the previous generation (i.e. if n=1, the three chromosomes having the lowest fitness function value) are carried over to the new generation. A cross-over is then performed using the topmost (lowest fitness function value) chromosome with the next 2n chromosomes to generate 2n new chromosomes. Next, the middle 2n chromosomes (i.e. the next chromosomes after the top 2n+1 are added to the new generation) are mutated to create 2n new chromosomes in the new generation.

As the functions within the described genetic algorithm each create new chromosomes, they are checked against the stored chromosomes in $LST_{RTS}$ to ensure no repeats. If the chromosome does not exist in $LST_{RTS}$, it is added to $LST_{RTS}$. Each chromosome is also checked to ensure it is a valid solution (no energized loop). If valid and not already in the $LST_{RTS}$ the chromosome is added to the new generation. If, after the above genetic manipulations are completed, the population number PN of the generation is not reached, additional chromosomes are created using the random switch swapping method described above. These chromosomes are checked against $LST_{RTS}$ and for validity, and then added to the generation until the PN of the new generation is met. Thereafter, the algorithm returns to step 112. This loop continues until the maximum number of generations (iterations) is reached, or a chromosome (corresponding to a particular network configuration) satisfies the fitness function criteria.

Figure 10:
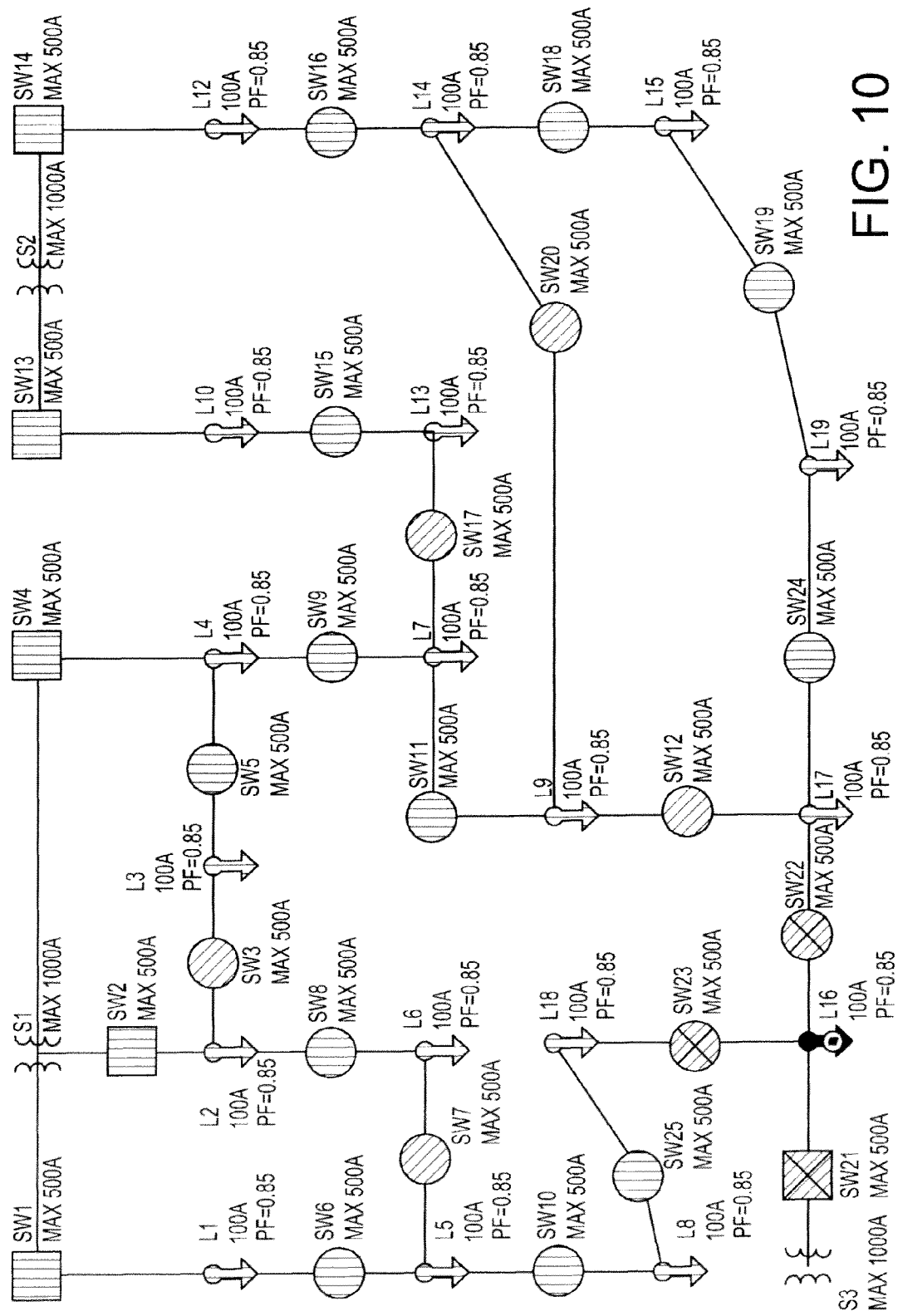
FIG. 10 is a schematic drawings of a third exemplary distribution network wherein a fault is isolated.

With reference now to FIG. 10, an example network is shown wherein a permanent fault has occurred at L16 and is isolated by SW23 and SW22. The example network of FIG. 10 is substantially identical to the network of FIGS. 3-8, except that the capacities of source S1, and switches SW4 and SW14 are 950 A, 550 A and 450 A respectively. As this network does not have a single-layer solution that satisfies capacity constraints while restoring all the un-faulted loads, it qualifies for the multi-layer reconfiguration analysis of the present invention. The base network is determined as described above, wherein NO tie switches having the highest spare capacity, SW25 and SW19, are closed to backfeed the unserved areas.

As discussed above, the fitness function is determined according to (Eq. 1). In the present example the following base network values for the fitness function as well as the user definable weights are shown. As can be seen, greater emphasis is placed on current capacity violations, amount of load that remains unserved and number of switching operations, than voltage violations and network (resistive) power loss in the system. Note that all the weight factors sum up to unity.

$$w_{sw}0.1, w_{loss}=0, w_{Vvio}=0, w_{Ivio}=0.35, w_{shed}=0.55$$

$$\text{NoTieSwitches}_{base}=5, \text{NoCurrentViolations}_{base}=2, \text{Load}_{base}=1700$$

Based on the parameter values as above and referring to (Eq. 1) to (Eq. 6) above, the fitness function for future calculations becomes:

$$f(idv)=0.1*\text{NoSwitchOperations}(idv)/5+0.35*\text{NoCurrentViolations}(idv)/2+0.55*\text{UnservedLoad}(idv)/1700$$

This network corresponds to the base chromosome as shown in FIG. 11. For the present example the input n=1. Thus, the population number is calculated according to: PN=6(1)+1=7. The generation number is initiated to GN=1. For the present example, the user selected fitness function threshold is 0.2. In other words, the fitness function of a candidate network must be 0.2 or lower to be considered a satisfactory restoration solution.

As described above, a switch swap matrix is derived for the base candidate network.

TABLE 3

Chromosome Matrix for Base Network 6 8 5 9 15 16 10 11 18 25 19 24 ← indices of NC switches

| | | | | | | | | | | | | |
|---|---|---|---|---|---|---|---|---|---|---|---|---|
| 3 | 0 | 0 | 1 | 0 | 0 | 0 | 0 | 0 | 0 | 0 | 0 | 0 |
| 7 | 1 | 1 | 0 | 0 | 0 | 0 | 0 | 0 | 0 | 0 | 0 | 0 |
| 17 | 0 | 0 | 0 | 1 | 1 | 0 | 0 | 0 | 0 | 0 | 0 | 0 |
| 20 | 0 | 0 | 0 | 1 | 0 | 1 | 0 | 1 | 0 | 0 | 0 | 0 |
| 12 | 0 | 0 | 0 | 1 | 0 | 1 | 0 | 1 | 1 | 0 | 1 | 1 |

↑ Indices of NO switches

Using the above matrix, which indicates the allowed switch swapping pairs (e.g., SW6 with SW7, SW8 with SW7, SW5 with SW3, but not SW6 with SW3, for instance), a first generation of PN=7 chromosomes are randomly generated as described below.

Figure 12:
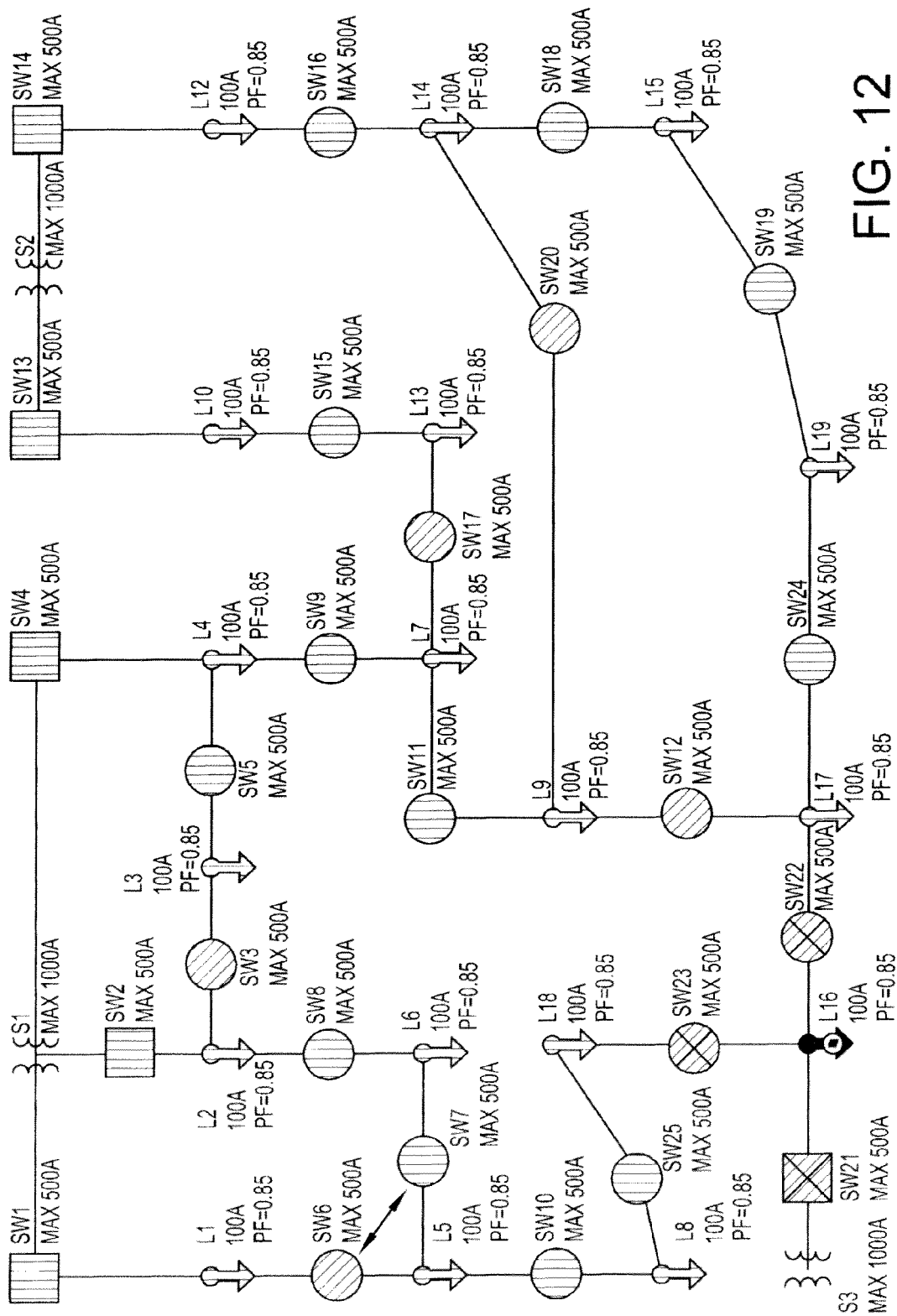
FIG. 12 is a schematic drawing of the distribution network of FIG. 10 wherein switches are swapped.

Chromosome 1.a: This is generated by swapping SW6 with SW7. The corresponding network is shown in FIG. 12 and the chromosome is displayed as [7 0 0 0 0 0 0 0 0 0 0 0]. The resulting network includes three capacity violations and no unserved load. The fitness function therefore evaluates to 0.1*4/5+0.35*3/2+0.55*0/1700=0.605

Figure 13:
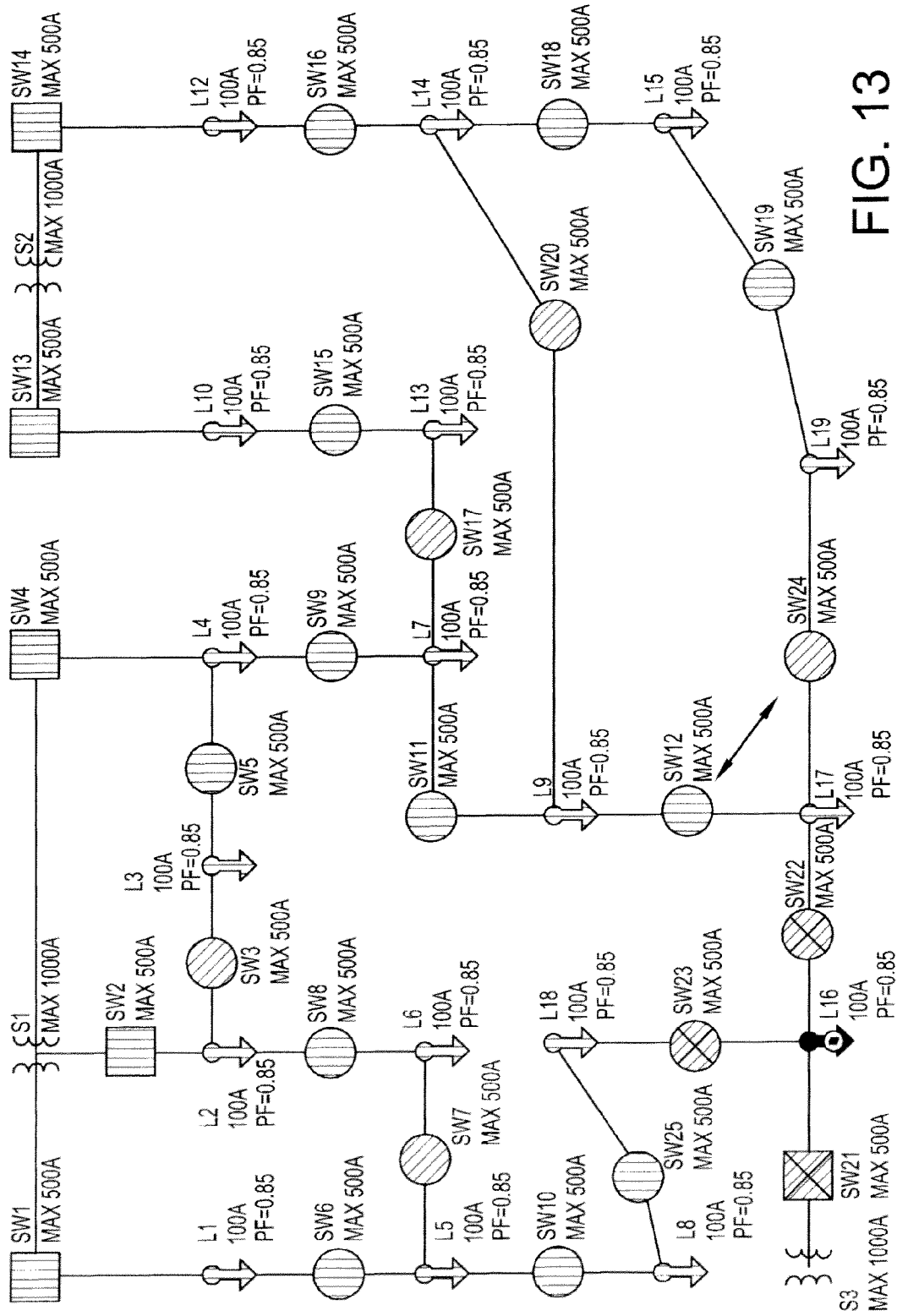
FIG. 13 is a schematic drawing of the distribution network of FIG. 10 wherein switches are swapped.

Chromosome 1.b: This is generated by swapping SW12 with SW24. The corresponding network is shown in FIG. 13 and the chromosome is displayed as [0 0 0 0 0 0 0 0 0 0 0 12]. The resulting network includes one capacity violation and no unserved load. The fitness function therefore evaluates to 0.1*4/5+0.35*1/2+0.55*0/1700=0.255

Figure 14:
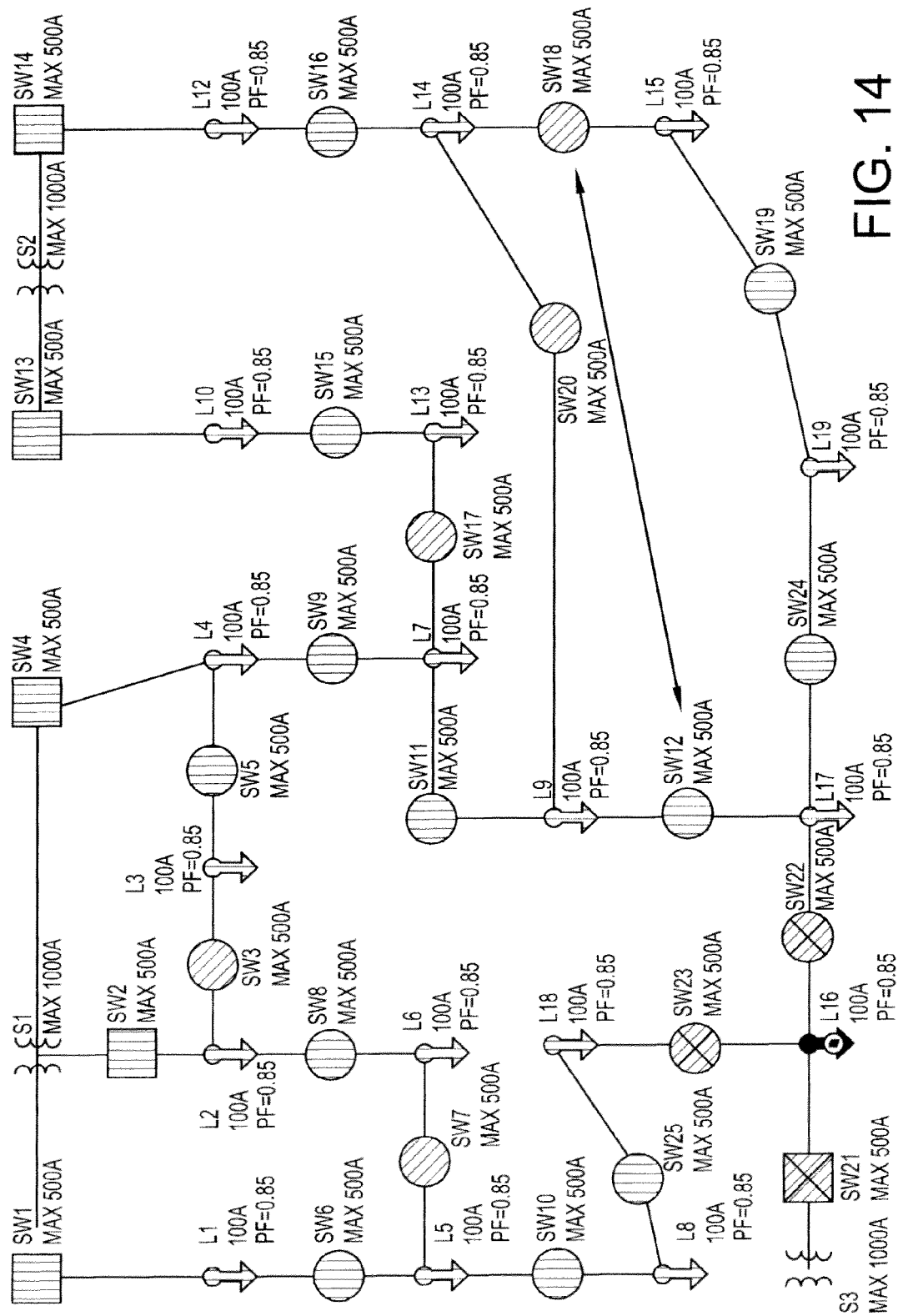
FIG. 14 is a schematic drawing of the distribution network of FIG. 10 wherein switches are swapped.

Chromosome 1.c: This is generated by swapping SW12 with SW18. The corresponding network is shown in FIG. 14 and the chromosome is displayed as [0 0 0 0 0 0 0 0 12 0 0 0]. The resulting network includes three capacity violations and no unserved load. The fitness function evaluates to 0.1*4/5+0.35*3/2+0.55*0/1700=0.605

Figure 15:
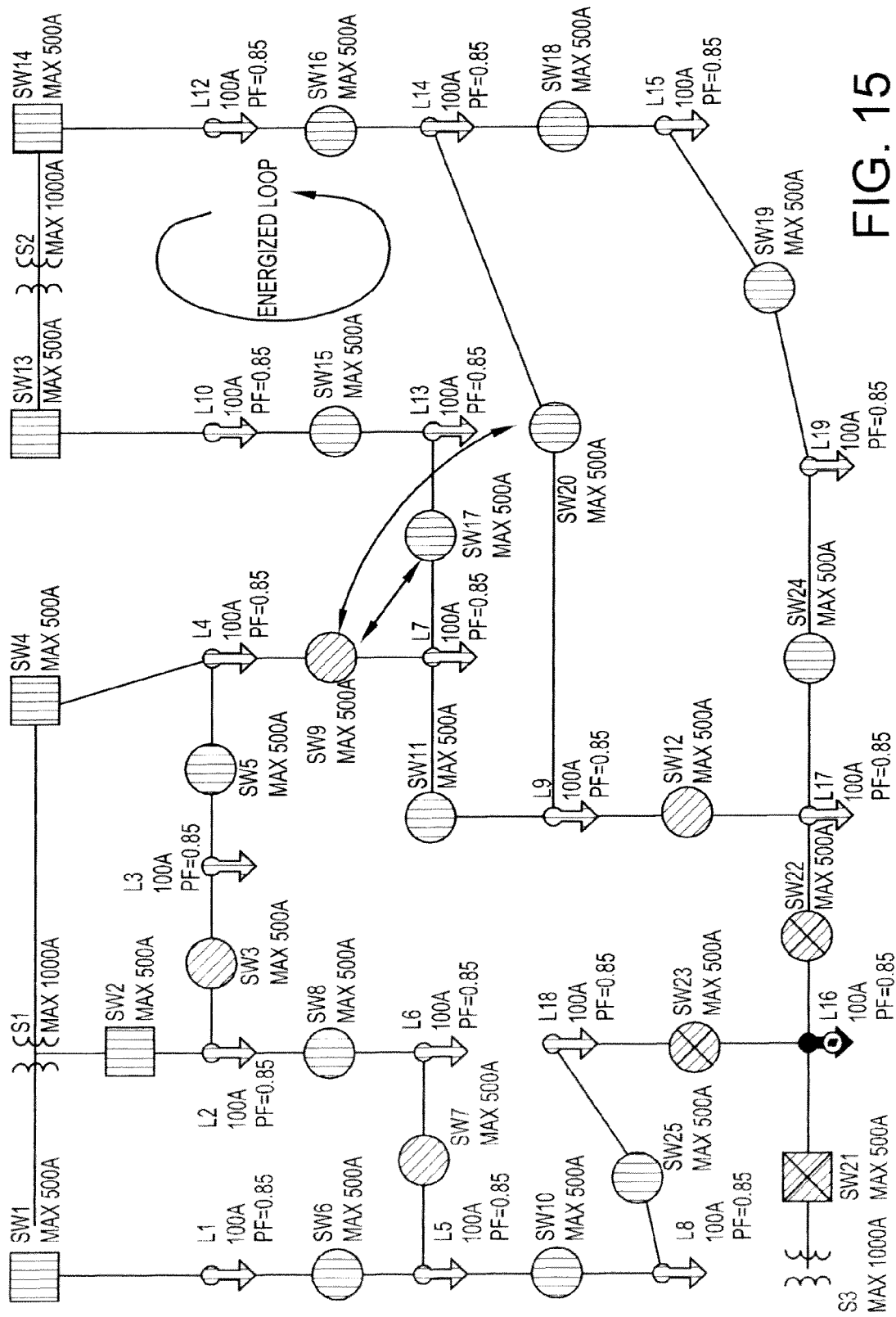
FIG. 15 is a schematic drawing of the distribution network of FIG. 10 wherein switches are swapped to create an energized loop.

Chromosome 1.d: This is generated by swapping SW9 with SW17, and SW9 with SW20. The corresponding network is shown in FIG. 15. Because the network includes an energized loop, this case is discarded and no chromosome is created.

Figure 16:
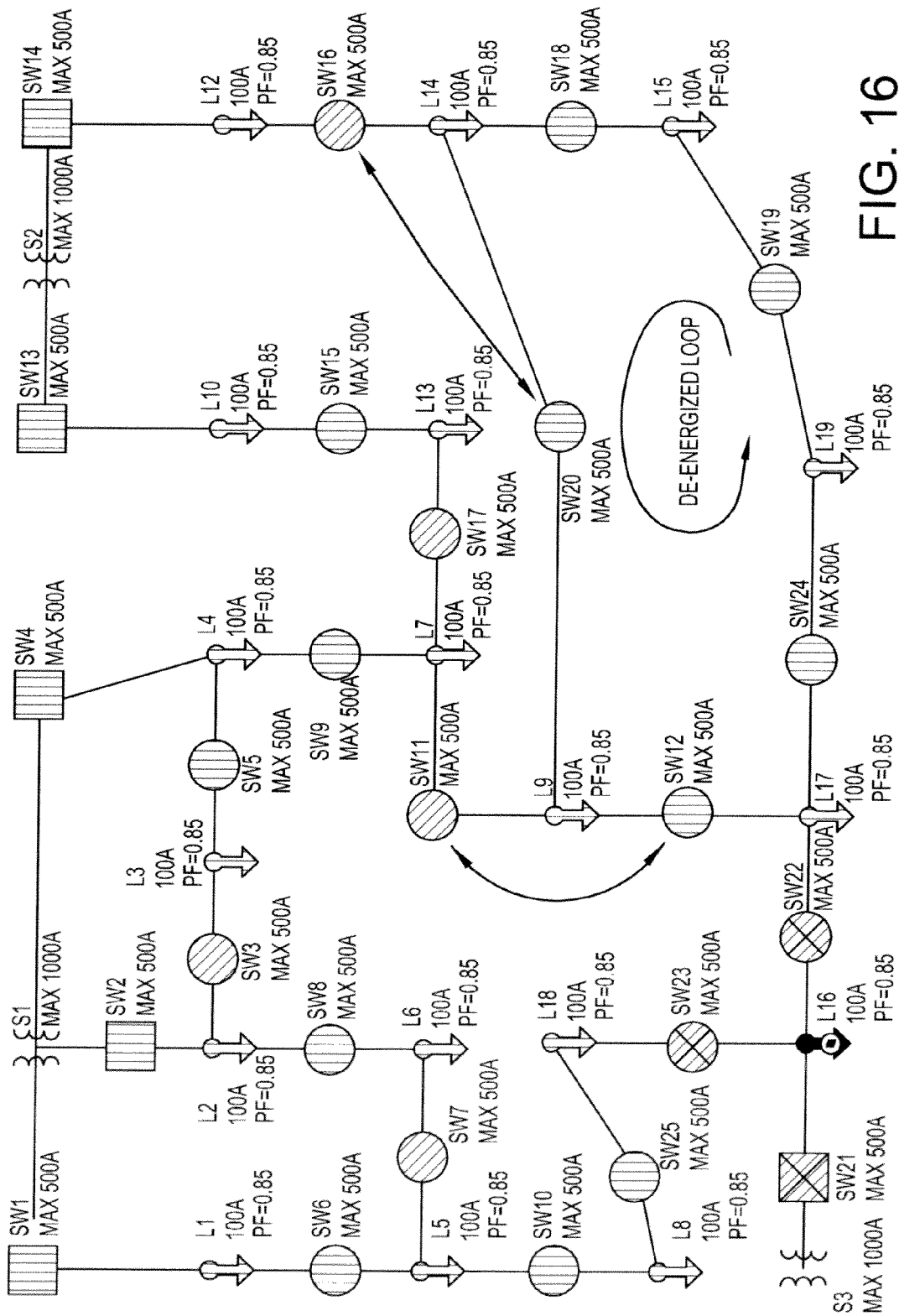
FIG. 16 is a schematic drawing of the distribution network of FIG. 10 wherein switches are swapped to create a deenergized loop.

Chromosome 1.e: This is generated by swapping SW11 with SW12, and SW16 with SW20. The corresponding network is shown in FIG. 16 and the chromosome is displayed as [0 0 0 0 0 20 0 12 0 0 0 0]. The resulting network includes a deenergized loop, and thus a total 500 A of unserved load. The fitness function evaluates to 0.1*6/5+0.35*0/2+0.55*500/1700=0.282.

Figure 17:
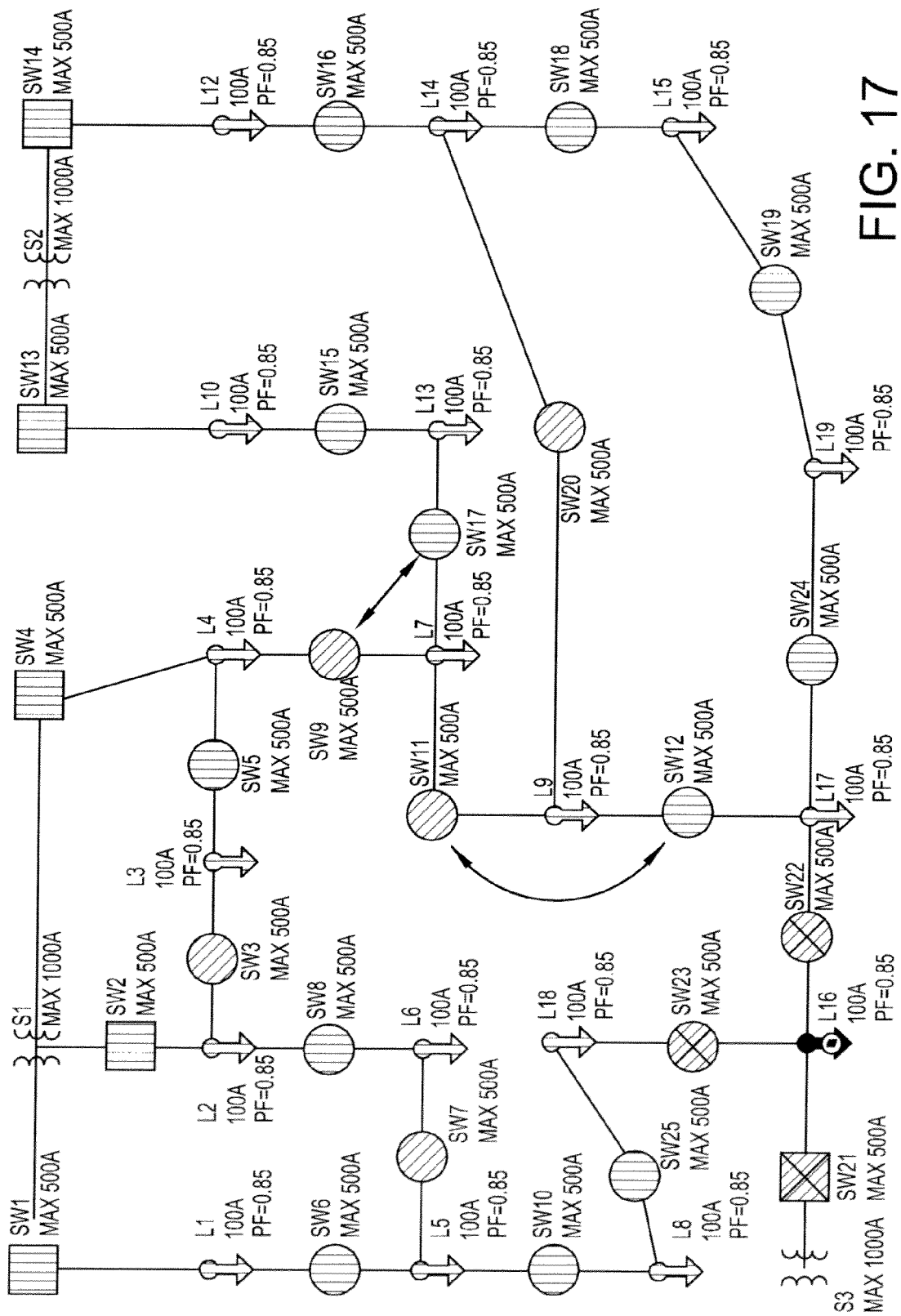
FIG. 17 is a schematic drawing of the distribution network of FIG. 10 wherein switches are swapped.

Chromosome 1.f: This is generated by swapping SW9 with SW17, and SW11 with SW12. The corresponding network is shown in FIG. 17 and the chromosome is displayed as [0 0 0 17 0 0 0 12 0 0 0 0]. The resulting network includes two capacity violations, but no unserved load. The fitness function evaluates to 0.1*6/5+0.35*2/2+0.55*0/1700=0.47.

Chromosome 1.g: This is generated by swapping SW9 with SW17 and the chromosome is [0 0 0 17 0 0 0 0 0 0 0 0]. The resulting network includes one capacity violation, but no unserved load. The fitness function evaluates to 0.1*4/5+0.35*1/2+0.55*0/1700=0.255.

Chromosome 1.h: This is generated by swapping SW5 with SW3 and the chromosome is [0 0 3 0 0 0 0 0 0 0 0 0]. The resulting network includes one capacity violation, but no unserved load. The fitness function evaluates to 0.1*4/5+0.35*2/2+0.55*0/1700=0.43.

In this manner, seven (7) valid chromosomes are created. The Searched Chromosome List $LST_{RTS}$ is initially empty, so all valid chromosomes are moved to $LST_{RTS}$. At this point in the process, the chromosomes are arranged in ascending order of their fitness function values, as shown in FIG. 18. As can be seen, chromosomes 1.b and 1.g are the best in the population (i.e. lowest fitness function values). However, because the best fitness function value 0.255 is higher than the pre-defined threshold 0.2, the analysis is continued to the next generation GN=2.

In order to form the chromosome population for the next generation, the top 2n+1=2(1)+1=3 chromosomes from FIG. 18 are carried over to the GN=2 population. These are shown in the top three rows (2.a through 2.c) in FIG. 19. Next, a crossover operation is performed between the top chromosome and the following 2n=2(1)=2 chromosomes to obtain new chromosomes 2.d and 2.e. The crossover operation between 2.a and 2.b produces 2.d, and between 2.a and 2.c to produces 2.e. This is further described in the following.

Chromosome 2.d: This is generated by performing a crossover operation between 2.a and 2.b. The crossover point is randomly selected.
2.a [0 0 0 0 |0 0 0 0 0 0 0 12] (Chromosome 2.a and a crossover place "|")
2.b [0 0 0 17 |0 0 0 0 0 0 0 0] (Chromosome 2.b)
=>2.d [0 0 0 17 |0 0 0 0 0 0 0 12] (Chromosome 2.d as a result of crossover)

Chromosome 2.e: This is generated by performing a crossover operation between 2.a and 2.c. The crossover point is randomly selected.
2.a [0 0 0 0 0 0 |0 0 0 0 0 12] (Chromosome 2.a and a crossover place "|")
2.c [0 0 0 0 0 20 |0 12 0 0 0 0] (Chromosome 2.c)
=>2.e [0 0 0 0 0 20 |0 0 0 0 0 12] (Chromosome 2.e as a result of crossover)

Next, the following 2n=2(1)=2 chromosomes from GN=1 (that is, 1.h and 1.f) are used to perform mutations and create the remaining chromosomes (2.f and 2.g) in the population of GN=2.

Chromosome 2.f: This is generated by performing a mutation operation on 1.h. The mutation is randomly done with allowed switch swapping operations as defined in switch swap matrix in Table 3.
1.h [0 0 3 0 0 0 0 0 0 0 0 0] (Chromosome 1.h)
=>2.f [0 0 3 17 0 0 0 0 0 0 0 0] (mutation by switch swap of SW9 & SW17)

Chromosome 2.g: This is generated by performing a mutation operation on 1.f. The mutation is randomly done with allowed switch swapping operations as defined in switch swap matrix in Table 3.
1.f [0 0 0 17 0 0 0 12 0 0 0 0] (Chromosome 1.h)
=>2.g [0 0 0 0 0 0 0 12 0 0 0 0] (mutation by switch swap of SW9 & SW17)

Figure 20:
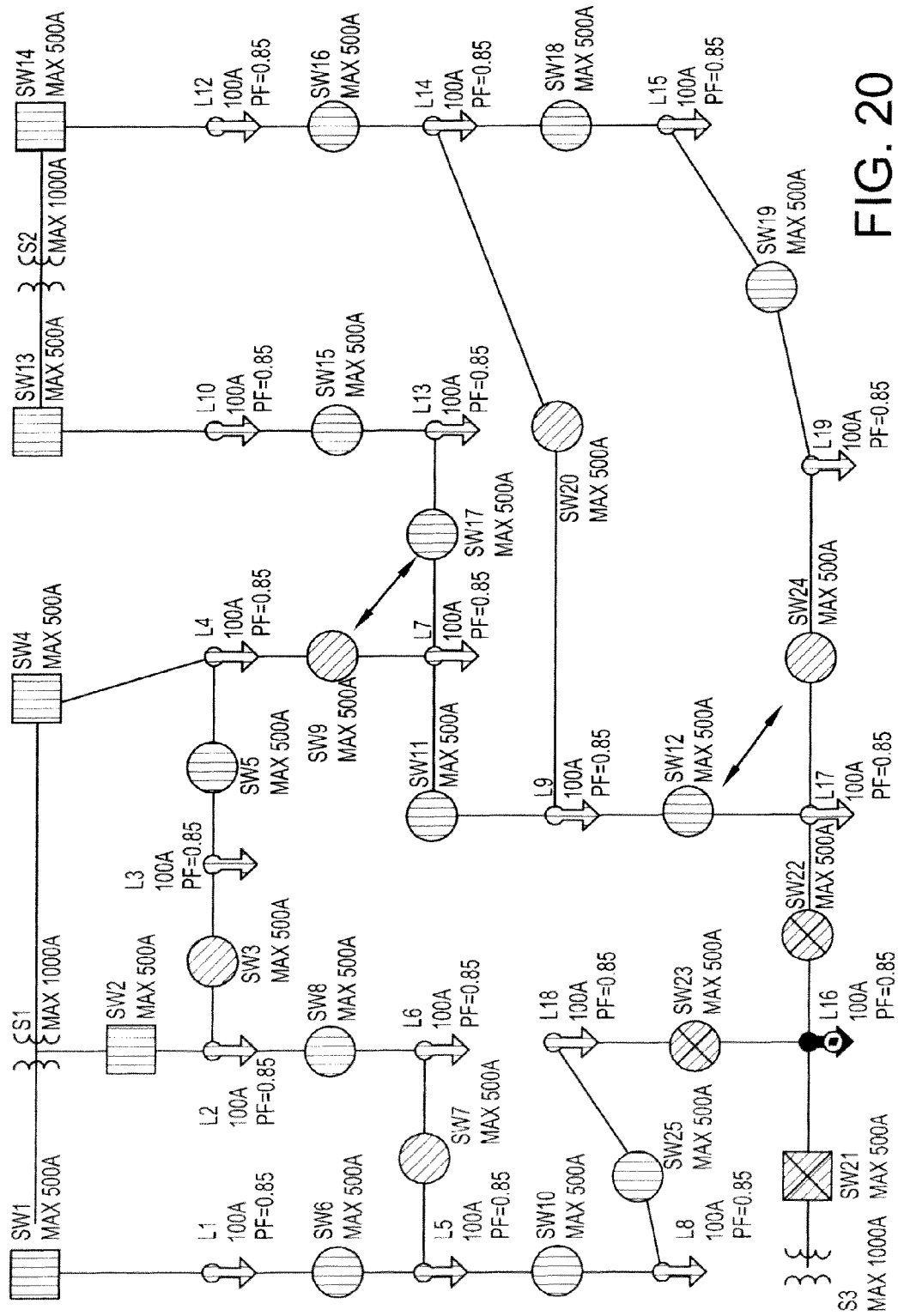
FIG. 20 is a schematic drawing of the distribution network of FIG. 10 wherein the network configuration corresponds to the best chromosome of the second generation.

The operations above obtain a full population PN=7 of valid chromosomes in second generation GN=2. FIG. 19 shows the chromosomes and the corresponding fitness function values. When the chromosomes in the table are arranged in the ascending order of fitness function values, the topmost chromosome (having the least fitness function value) is 2.d. This is generated by swapping SW9 with SW17, and SW24 with SW12, with the corresponding network shown in FIG. 20. This results in no capacity violations, as well as no unserved load. The fitness function evaluates to (also shown in FIG. 19) 0.1*6/5+0.35*0/2+0.55*0/1700=0.12. As 0.12 is less than the fitness function threshold value of 0.2, this chromosome (and its corresponding restoration switching scheme) are the restoration solution.

This process results in the identification of a solution as the closing of SW12 and SW9, and opening of SW24 and SW17. Note that the entire load would be restored (except L16, where the permanent fault exists) via alternate sources, and all the alternate sources as well as the breakers/switches would carry currents within their capacity limits. Thus this qualifies as a good reconfiguration solution.

The method of the present invention requires network load flow calculations (in order to evaluate the fitness function) only for the valid chromosomes in question, as opposed to many more load flow calculations if approaches such as classical genetic algorithm, network tracing or deterministic optimization methods are used. This increases the speed of solution finding, thus making it appropriate for real-time restoration switching applications. It is especially practical for multi-layer RSA, when the network topology is complex (for example, many tie switches between adjacent feeders)

and many different alternatives for back-feed restoration exist. The functionality of multi-layer RSA would reside at either at DMS or in a sub-station.

As will be appreciated by one of ordinary skill in the art, the present invention may be embodied as or take the form of the method and system previously described, as well as of a computer readable medium having computer-readable instructions stored thereon which, when executed by a processor, carry out the operations of the present inventions as previously described. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for determining back-feed paths to out-of-service load areas in a network after fault isolation, the method comprising:
   i. determining a base network state;
   ii. determining baseline values of a fitness function for said base network state;
   iii. initializing a chromosome list ($LST_{RTS}$);
   iv. creating initial chromosomes, for each created initial chromosome, if valid and not in $LST_{RTS}$, adding said initial chromosome to an initial chromosome population; for each said initial chromosome created, adding said initial chromosome to said $LST_{RTS}$;
   v. generating fitness function values for each chromosome in said initial chromosome population;
   vi. sorting said chromosomes by fitness function value, said chromosome having the lowest fitness function value being the best candidate chromosome;
   vii. determining if the fitness function value of said best candidate chromosome is below a threshold fitness value, and if so, outputting a network configuration corresponding to said best candidate chromosome;
   viii. if said fitness function value of said best candidate chromosome is not below said threshold fitness value, using genetic manipulation to create new chromosomes for a new chromosome population, during said creation of said new chromosome population, rejecting any new chromosomes already in said $LST_{RTS}$ and adding said new chromosomes in said new population to said $LST_{RTS}$;
   ix. generating fitness function values for each chromosome in said new population; and
   x. repeating steps vi-ix until the fitness function value of said best candidate chromosome is below said threshold fitness value or until a predetermined number of new populations are created, whereupon a network configuration corresponding to said best candidate chromosome is output.

2. The method of claim 1 wherein said fitness function comprises:

$$f(idv) = w_{Sw}SwOp_{nr}(idv) + w_{loss}SysLoss_{nr}(idv)$$

$$+ w_{Vvio}Vvio_{nr}(idv) + w_{Ivio}Ivio_{nr}(idv) + w_{shed}(P_{nr}(idv))$$

where idv is the index of an individual network topology corresponding to a chromosome; f(idv) is the fitness function value; $SysLoss_{nr}$ is the corresponding normalized system power loss; $Vvio_{nr}$ is the corresponding normalized number of voltage violations; $Ivio_{nr}$ is the corresponding normalized number of current violations; $SwOp_{nr}$ is the corresponding normalized number of switching operations; $P_{nr}$ is the corresponding normalized total unserved load after restoration; and $W_{loss}$, $W_{Vvio}$, $W_{Ivio}$, $W_{sw}$, $W_{shed}$ are user assigned weighting factors.

3. The method of claim 2 wherein $$SysLoss_{nr}(idv) = SysLoss(idv)/SysLoss_{base};$$

$$Vvio_{nr}(idv) = NoVoltViolations(idv)/NoVoltViolations_{base}$$

$$Ivio_{nr}(idv) = NoCurrentViolations(idv)/NoCurrentViolations_{base}$$

$$SwOp_{nr}(idv) = NoSwitchOperations(idv)/NoTieSwitches_{base}$$

$$P_{nr}(idv) = UnservedLoad(idv)/Load_{base}$$

where $SysLoss_{base}$ is the power loss in said base network state; SysLoss(idv) is the corresponding power loss in a candidate network corresponding to a chromosome; $NoVoltViolations_{base}$ is the number of voltage violations in said base network state; NoVoltViolations(idv) is the corresponding voltage violations in a candidate network corresponding to a chromosome; $NoCurrentViolations_{base}$ is the number of current violations in said base network state; NoCurrentViolations(idv) is the corresponding number of current violations in a candidate network corresponding to a chromosome; $NoTieSwitches_{base}$ is the number of tie switches in said base network state; NoSwitchOperations(idv) is the corresponding number of switching operations to attain in a candidate network corresponding to a chromosome; $Load_{base}$ is the total load of said base network state; UnservedLoad(idv) is the corresponding total unserved load in a candidate network corresponding to a chromosome.

4. The method of claim 1 wherein said step of determining a base network state includes, for each out-of-service load area, closing a normally open tie switch.

5. The method of claim 1 wherein said step of creating initial chromosomes includes creating a swap matrix, wherein rows of said swap matrix correspond to normally open tie switches of said base network state, and columns of said swap matrix correspond to upstream normally closed switches that can be swapped; and creating said initial chromosomes by randomly swapping one or more of said normally open tie switches with said upstream switches that can be swapped.

6. The method of claim 1 wherein said step of using genetic manipulation to create new chromosomes for a new chromosome population further comprises selecting a plurality of chromosomes from said initial population; and performing crossovers and mutations on said plurality of chromosomes from said initial population.

7. The method of claim 5 wherein said initial chromosome population includes 6n+1 initial chromosomes, where n is a user defined variable.

8. The method of claim 7 wherein said step of using genetic manipulation to create new chromosomes of a new chromosome population further comprises:

adding the top 2n+1 chromosomes from a previous generation to a new generation unchanged;

crossing-over the best candidate chromosome from the previous generation with the next 2n chromosomes after the best candidate chromosome from the previous generation to generate 2n new chromosomes;

mutating the next 2n chromosomes after the top 2n+1 from the previous generation to create 2n new chromosomes in the new generation; and if additional new chromosomes are required to fill said new generation, randomly swapping according to said swap matrix.

9. A method for determining a network topology to restore power to an out-of-service load area in a power network after a fault has been isolated in the power network, wherein the power network comprises a plurality of normally closed switches and a plurality of normally open tie switches, at least one of said normally closed switches has opened to isolate said fault, the at least one normally closed switch that opened to isolate said fault and at least one of said normally open tie switches collectively create said out-of-service load area, and a network topology comprises open/closed switch states for said normally closed switches and said normally open tie switches, the method comprising:

i. determining a base network topology, wherein the open/closed switch states of said base network topology restore power to said out-of-service load area;

ii. determine a baseline fitness value for said base network topology using a fitness function;

iii. initializing a chromosome list ($LST_{RTS}$);

iv. creating initial chromosomes each corresponding to a candidate network topology, wherein the chromosome for each candidate network topology identifies a downstream switch for at least one of said normally closed switches and normally open tie switches, and the open/closed switch state of said downstream switch is swapped with the open/closed switch state of said at least one of said normally closed switches and normally open tie switches to change the open/closed switch states of said base network topology to the open/closed switch states of said candidate network topology;

v. applying a predetermined validity criteria to determine whether each created initial chromosome is valid;

vi. adding to said $LST_{RTS}$ and to an initial chromosome population each created initial chromosome that is valid and not already in said $LST_{RTS}$;

vii. determining for each chromosome in said initial chromosome population a fitness value for the corresponding candidate network topology using said fitness function;

viii. identifying the chromosome in $LST_{RTS}$ with the lowest fitness value as a best candidate chromosome;

ix. outputting the candidate network topology corresponding to said best candidate chromosome when said fitness value for said best candidate chromosome is below a predefined threshold fitness value;

x. creating new chromosomes for a new chromosome population when said fitness value for said best candidate chromosome is not below said threshold fitness value, and adding to said $LST_{RTS}$ each new chromosome of said new chromosome population that is not already in said $LST_{RTS}$;

xi. determining for each chromosome in said new population a fitness value for the corresponding candidate network topology using said fitness function; and xii. repeating steps viii-xi until the fitness value for said best candidate chromosome is below said threshold fitness value or until a predetermined number of new chromosome populations are created, whereupon the candidate network topology corresponding to said best candidate chromosome is output.

10. The method of claim 9 wherein said fitness function comprises:

$$f(idv)=w_{Sw}SwOp_{nr}(idv)+w_{loss}SysLoss_{nr}(idv)$$
$$+w_{Vvio}Vvio_{nr}(idv)+w_{Ivio}Ivio_{nr}(idv)+w_{shed}(P_{nr}(idv))$$

where idv is the index of a candidate network topology corresponding to a chromosome; and for the candidate network topology: f(idv) is the fitness function value; $SysLoss_{nr}$ is the corresponding normalized network power loss; $Vvio_{nr}$ is the corresponding normalized number of voltage violations; $Ivio_{nr}$ is the corresponding normalized number of current violations; $SwOp_{nr}$ is the corresponding normalized number of switching operations; $P_{nr}$ is the corresponding normalized total unserved load after restoration; and $W_{Loss}$, $W_{Vvio}$, $W_{Ivio}$, $W_{Sw}$, $W_{shed}$ are user assigned weighting factors.

11. The method of claim 10 wherein $$SysLoss_{nr}(idv)=SysLoss(idv)/SysLoss_{base};$$

$$Vvio_{nr}(idv)=NoVoltViolations(idv)/NoVoltViolations_{base}$$

$$Ivio_{nr}(idv)=NoCurrentViolations(idv)/NoCurrentViolations_{base}$$

$$SwOp_{nr}(idv)=NoSwitchOperations(idv)/NoTieSwitches_{base}$$

$$P_{nr}(idv)=UnservedLoad(idv)/Load_{base}$$

where $SysLoss_{base}$ is the power loss in said base network topology; SysLoss(idv) is the power loss in said candidate network topology corresponding to said chromosome; $NoVoltViolations_{base}$ is the number of voltage violations in said base network topology; NoVoltViolations(idv) is the number of voltage violations in said candidate network topology corresponding to said chromosome; $NoCurrentViolations_{base}$ is the number of current violations in said base network topology; NoCurrentViolations(idv) is the number of current violations in said candidate network topology corresponding to said chromosome; $NoTieSwitches_{base}$ is the number of normally open tie switches in said base network topology; NoSwitchOperations(idv) is the number of switching operations to attain said candidate network topology corresponding to said chromosome; $Load_{base}$ is the total load of said base network topology; UnservedLoad(idv) is the total unserved load in said candidate network topology corresponding to said chromosome.

12. The method of claim 9 wherein said step of determining a base network topology includes closing a normally open tie switch to restore power to each out-of-service load area.

13. The method of claim 9 wherein said step of creating initial chromosomes includes creating a swap matrix, wherein rows of said swap matrix correspond to normally open tie switches of said base network topology, columns of said swap matrix correspond to upstream normally closed switches, and elements of said swap matrix indicate whether the respective open/closed switch states can be swapped between the normally open tie switch of the corresponding row and the upstream normally closed switch of the corresponding column.

14. The method of claim 9 wherein said step of creating new chromosomes for a new chromosome population further comprises:
    selecting a plurality of chromosomes from said initial chromosome population; and
    performing crossovers and mutations on said plurality of chromosomes from said initial population.

15. The method of claim 13 wherein said initial chromosome population includes 6n+1 initial chromosomes, where n is a user defined variable.

16. The method of claim 15 comprising ordering the chromosomes in a previous generation chromosome population by their fitness values, wherein said chromosomes are ordered from lowest fitness value to highest fitness value, and said step of creating new chromosomes of a new chromosome population further comprises:
    adding the 2n+1 chromosomes having the 2n+1 lowest fitness values from the previous generation to the new generation chromosome population unchanged;
    crossing-over said best candidate chromosome with the next 2n chromosomes after said best candidate chromosome from the previous generation to generate 2n new chromosomes, wherein the next 2n chromosomes have the next 2n lowest fitness values after the 2n+1 chromosomes having the 2n+1 lowest fitness values;
    mutating the next 2n chromosomes after the top 2n+1 chromosomes to create 2n new chromosomes in the new generation chromosome population; and
    randomly swapping open/closed switch states according to said swap matrix to create additional new chromosomes for the new generation chromosome population if needed for the new generation chromosome population to include 6n+1 chromosomes.

17. The method of claim 9 wherein said predetermined validity criteria indicates that any chromosome creating an energized loop within the power network is not valid.

18. The method of claim 9 comprising applying said predetermined validity criteria to determine whether each created new chromosome is valid, wherein said predetermined validity criteria indicates that any chromosome creating an energized loop within the power network is not valid, and excluding from $LST_{RTS}$ each new chromosome determined to be not valid.

19. The method of claim 9 wherein a network topology is determined to restore power to a plurality of out-of-service load areas in the power network after said fault has been isolated, and said at least one normally closed switch opened to isolate the fault and said at least one of said normally open tie switches collectively create said plurality of out-of-service load areas.

20. The method of claim 9 wherein the chromosome for each candidate network topology identifies a downstream normally open tie switch for at least one of said normally closed switches, and the open/closed switch state of said downstream normally open tie switch is swapped with the open/closed switch state of said at least one of said normally closed switches to change the open/closed switch states of said base network topology to the open/closed switch states of said candidate network topology.

21. The method of claim 12 wherein closing a normally open tie switch to restore power to each out-of-service load area includes identifying a normally open tie switch having the highest spare capacity for each out-of-service load area, closing each said normally open tie switch having the highest spare capacity for each said out-of-service load area to restore power to each said out-of-service load area.

22. The method of claim 13 wherein said step of creating initial chromosomes includes creating said initial chromosomes by randomly swapping the open/closed switch state of one or more of said normally open tie switches with the open/closed switch state of said upstream normally closed switches with which it can be swapped.

* * * * *